(12) United States Patent
Bentley et al.

(10) Patent No.: US 12,447,508 B2
(45) Date of Patent: Oct. 21, 2025

(54) HOME COOKING APPLIANCE HAVING AN INTEGRATED DOOR GLASS SURFACE CLEANER FOR AUTOMATIC REMOVAL OF COOKING DEBRIS

(71) Applicants: BSH Home Appliances Corporation, Irvine, CA (US); BSH Hausgeräte GmbH, Munich (DE)

(72) Inventors: Garrett Bentley, Knoxville, TN (US); Luc Lam, Irvine, CA (US)

(73) Assignees: BSH Home Appliances Corporation, Irvine, CA (US); BSH Haugeräte GmbH, Munich (DE)

(*) Notice: Subject to any disclaimer, the term of this patent is extended or adjusted under 35 U.S.C. 154(b) by 692 days.

(21) Appl. No.: 17/738,067

(22) Filed: May 6, 2022

(65) Prior Publication Data
US 2023/0358409 A1  Nov. 9, 2023

(51) Int. Cl.
*B08B 1/00*   (2024.01)
*B08B 1/16*   (2024.01)
*B08B 1/20*   (2024.01)
*B08B 1/54*   (2024.01)
*F24C 15/02*  (2006.01)
*F24C 15/04*  (2006.01)

(52) U.S. Cl.
CPC .............. *B08B 1/165* (2024.01); *B08B 1/20* (2024.01); *B08B 1/54* (2024.01); *F24C 15/023* (2013.01); *F24C 15/04* (2013.01)

(58) Field of Classification Search
CPC ... B08B 1/165; B08B 1/50; B08B 1/20; F24C 15/023; F24C 15/04

USPC ....................................................... 126/273 R
See application file for complete search history.

(56) References Cited

U.S. PATENT DOCUMENTS 1,439,756 A    12/1922  Pratt
4,084,572 A *   4/1978  Schettl ................... F24C 15/04
                                                    126/200

(Continued)

FOREIGN PATENT DOCUMENTS

CN    208113014 U    11/2018
CN    210444519 U     5/2020
JP    H04198628 A     7/1992

(Continued)

OTHER PUBLICATIONS

2011 For Translation.*

*Primary Examiner* — Avinash A Savani
(74) *Attorney, Agent, or Firm* — Michael E. Tschupp; Brandon G. Braun; Andre Pallapies

(57) ABSTRACT

A home cooking appliance includes a housing having a cooking cavity and a door movable between a closed state and an open state for providing access to an opening of the cooking cavity. The door has a glass surface facing an interior of the cooking cavity when the door is in the closed state, and at least a portion of the door is configured to be retractable into a position adjacent to a wall of the cooking cavity upon moving the door into the open state. The appliance includes a surface cleaning mechanism on the housing and configured to remove debris from at least a portion of the glass surface during at least one of a retraction of the door into the position adjacent to the wall of the cooking cavity and an extraction of the door from the position adjacent to the wall of the cooking cavity.

20 Claims, 22 Drawing Sheets

(56) References Cited

U.S. PATENT DOCUMENTS

2006/0289530 A1* 12/2006 Cordae ................ F24C 15/026
219/756
2018/0087779 A1* 3/2018 Maldonado ........... F24C 15/162

FOREIGN PATENT DOCUMENTS

WO        1991008273 A1    6/1991
WO    WO-2011007094 A1 *  1/2011  ............. C10B 43/04

* cited by examiner

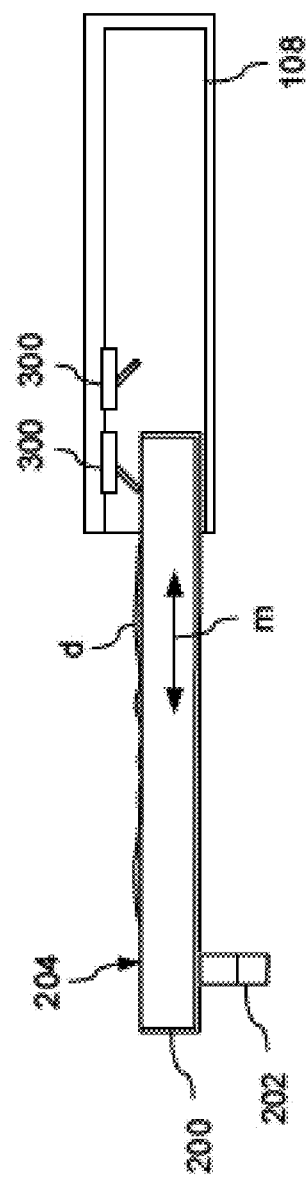
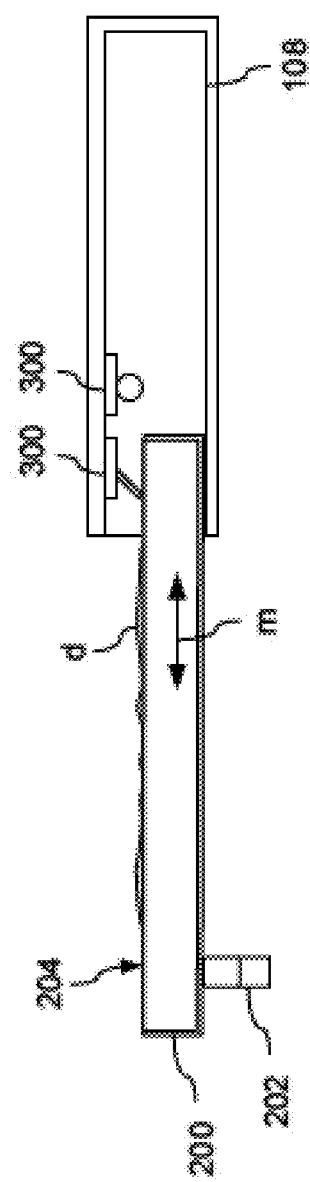
FIG. 15A
FIG. 15B

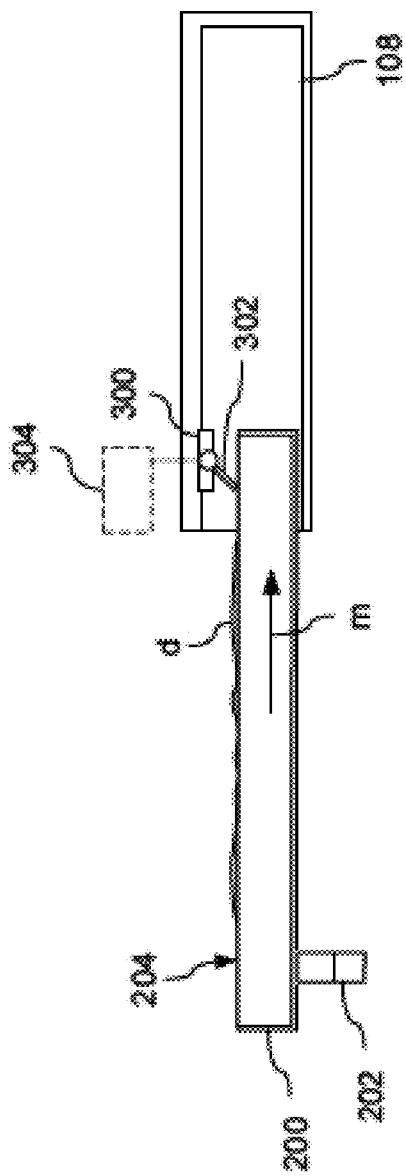
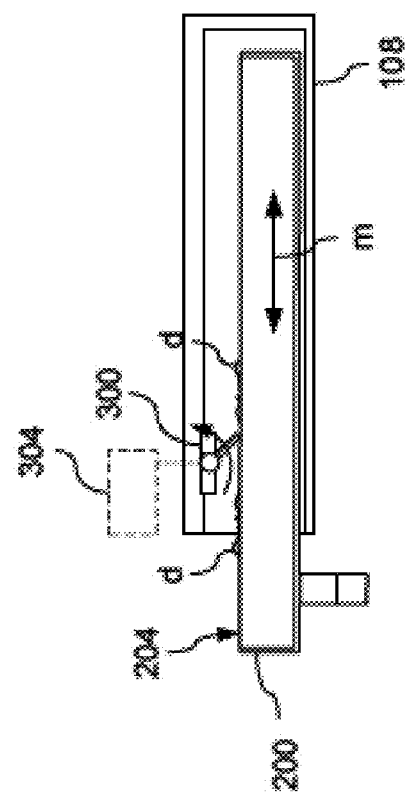
FIG. 16A
FIG. 16B

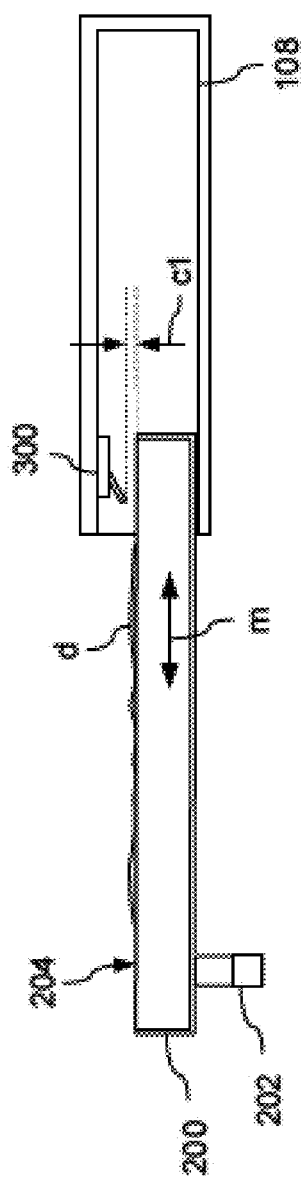
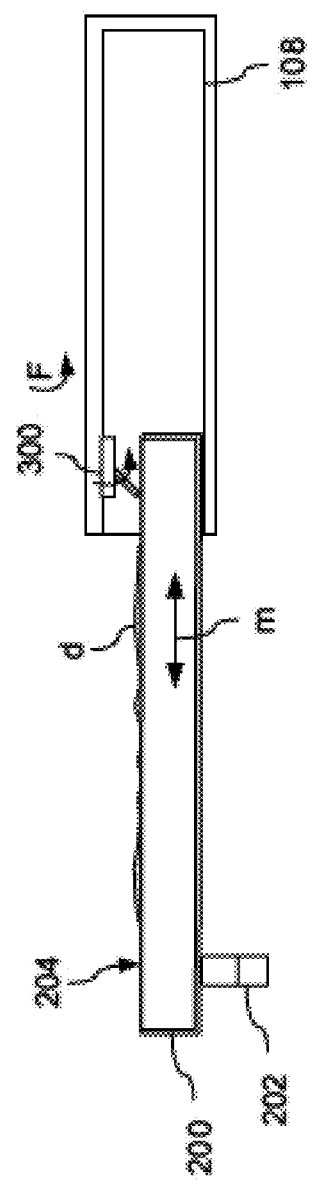
FIG. 17A
FIG. 17B

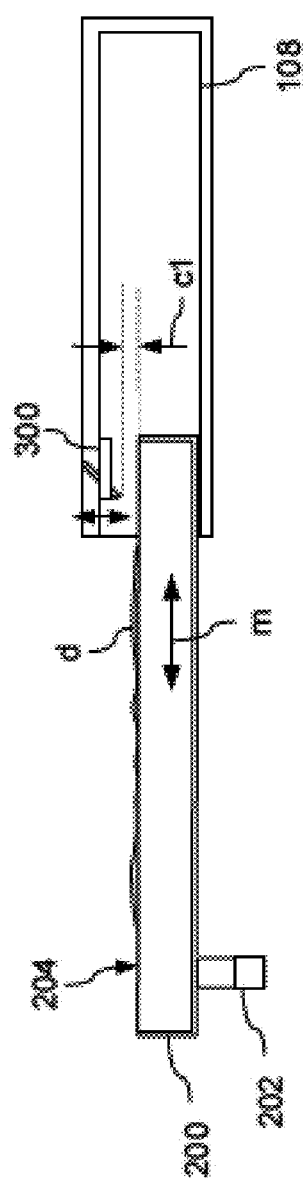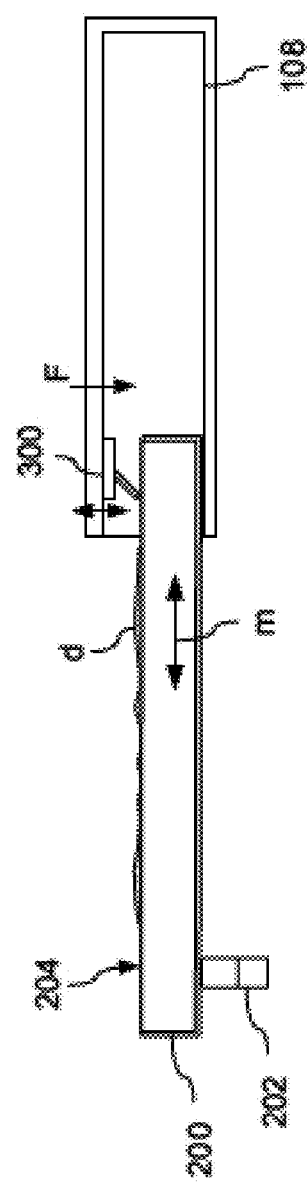
FIG. 18A
FIG. 18B

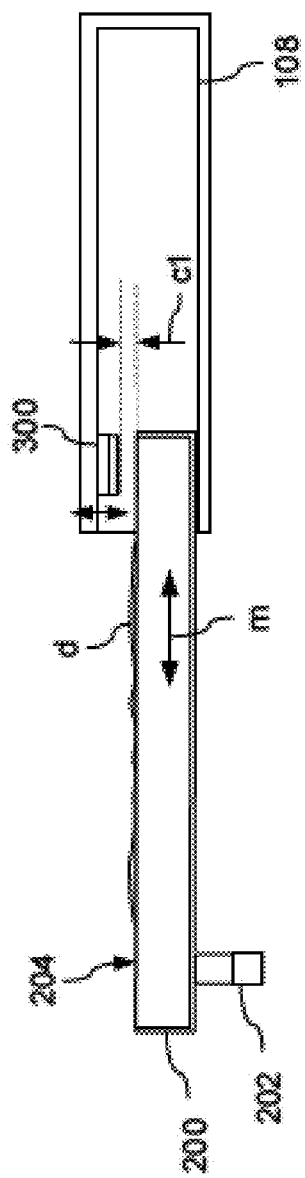
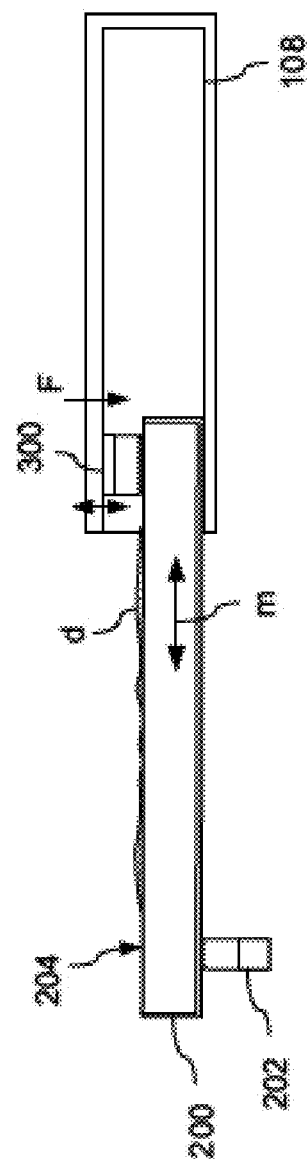
FIG. 19A
FIG. 19B

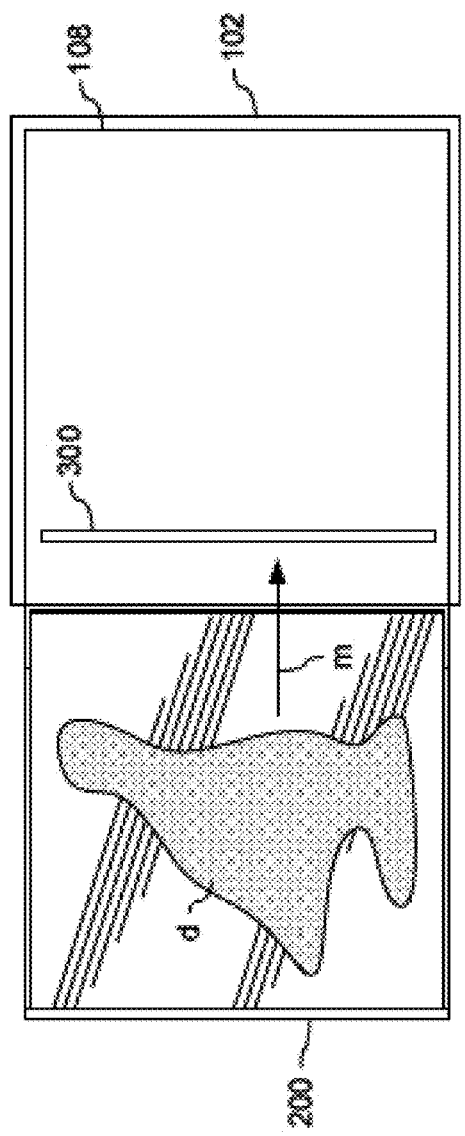
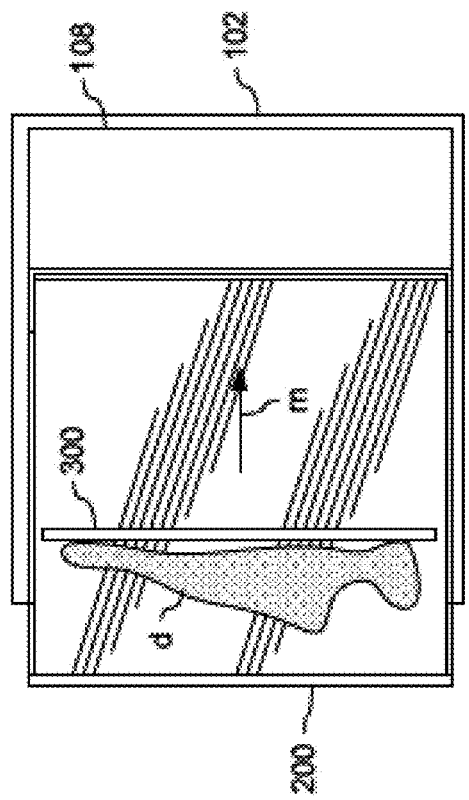
FIG. 20A
FIG. 20B

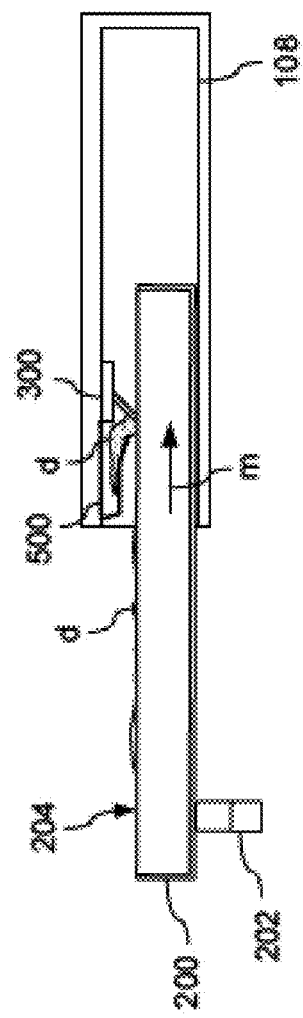
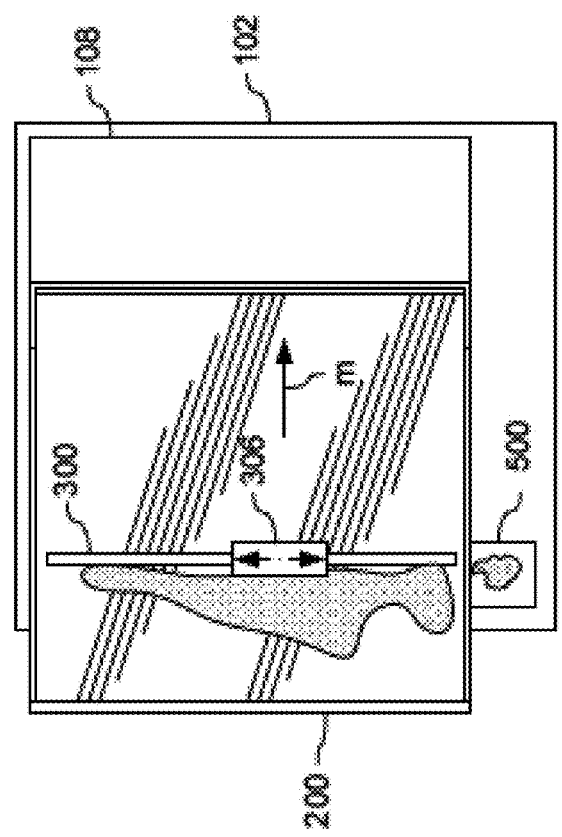
FIG. 22A
FIG. 22B

HOME COOKING APPLIANCE HAVING AN INTEGRATED DOOR GLASS SURFACE CLEANER FOR AUTOMATIC REMOVAL OF COOKING DEBRIS

FIELD OF THE INVENTION

The present invention is directed to a home cooking appliance having a surface cleaner for the door glass, and more particularly, to a home cooking appliance having an integrated door glass surface cleaner for automatic removal of cooking debris from the door glass.

BACKGROUND OF THE INVENTION

A conventional home cooking appliance, such as a wall oven or stand-alone range, commonly includes a door having door glass for viewing into the cooking cavity of the appliance. During operation of such a home cooking appliance, grease, smoke, and/or food debris may settle on one or more interior surfaces of the cooking appliance, including the inner surface of the door glass facing the cooking cavity. Some conventional cooking appliances may utilize a retractable door system having door glass, wherein the retractable door system can include a door that folds or hinges to permit access to the cooking cavity and then can be retracted into the body or cabinetry of the appliance adjacent to a part of the cooking cavity.

SUMMARY OF THE INVENTION

The present invention recognizes that a buildup of grease, smoke and/or food debris on the inner surface of the door glass may obstruct the visibility through the door glass into the cooking cavity of the appliance. For example, such a buildup of grease, smoke and/or food debris on the door glass may obstruct a user's visibility through the door glass into the cooking cavity of the appliance.

The present invention further recognizes that some home cooking appliances may have a vision system including, for example, a camera integrated into, or attached to, the door that views into the cooking cavity through the door glass. In such an instance, the effect of grease, smoke and/or food debris build up on the door glass may reduce or degrade the ability to see through the inner glass surface, which may cause a loss of functionality for the camera system or reduce the capabilities of the camera system.

In order to clean or remove a buildup of grease, smoke and/or food debris on the inner surface of the door glass, a variety of cleaning methods may be periodically performed. For example, when a user recognizes that debris has built up on the door glass, the user may periodically manually clean the surface of the door glass using various manual cleaning methods, such as scraping the glass surface with a razor blade, using an abrasive scrubber, or using a chemical cleaner, similar to such techniques for cleaning glass surfaces of a glass cooktop. However, such manual or hand-scraping may be inconvenient for a user to perform on a regular basis that is sufficient to prevent build up, may require additional hand-held tools such as scrapers or cleaners, and may require a vigorous effort by the user.

Moreover, for safety reasons, to prevent burns, such manual cleaning typically is more appropriately performed when the cooking appliance is no longer hot. However, the present invention recognizes that the instance in time in which a user commonly notices or recognizes that the door glass needs to be cleaned often corresponds to a time in which the cooking appliance is in operation, or in which the cooking appliance has just completed a cooking operation, wherein the cooking appliance is hot. Once the cooking appliance cools, the need to clean the door glass may no longer be on the top of mind, or of great concern at that time, for the user. As a result, a user may move on to other activities or forget to clean the door glass, thereby leading to continued buildup of debris over time or over repeated uses, which may further affect the visibility of a user or vision system through the door glass.

In some instances, a home cooking appliance may be configured with an automatic or self-cleaning pyrolytic cleaning cycle. Accordingly, when a user recognizes that debris has built up on the door glass, the user may periodically initiate such pyrolytic cleaning to attempt to clean the surface of the door glass. However, pyrolysis cleaning typically is only rarely performed to clean large messes or when a lot of buildup has occurred in the cooking appliance over an extended period of time. Indeed, many users run pyrolytic self-cleaning cycles less than one time per year. This low frequency of cleaning may allow buildup to become "baked in," thereby resulting in the buildup of debris being even more difficult to remove through any cleaning method. Moreover, many users do not like the high temperature and occasional odors that may accompany such pyrolytic cleaning methods. Additionally, during a typical automatic cleaning cycle of an oven, due to the nature of the design of glass doors, the internal glass surface may not be heated to a high enough temperature to fully pyrolyze the grease, smoke and/or food debris build up on the door glass as would be preferred or necessary to fully clean a transparent surface, leaving some film or debris remaining on the glass, which may still affect visibility through the door glass.

Yet another method of cleaning the door glass may include automatic steam or water spray cleaning. These methods involve adding moisture to help release grease, or to utilize a spraying mechanism to spray water/detergent mix across all surfaces. These methods may have mixed effectiveness in cleaning. Also, similar to pyrolytic cleaning, such methods are often not run as frequently as needed to prevent buildup from getting excessive or "baking in." Furthermore, these methods may require the integration of costly systems to the cooking appliance.

As an alternative to cleaning or in an attempt to minimize cleaning, some appliances may include an oleophobic coating/layer, or the like, applied to glass. These coatings may make it more difficult for grease and oil based substances to bond or adhere to a surface. However, many of these coatings are unable to perform after repeated exposure to the high temperatures of a cooking appliance, such as an oven. Moreover, in some cases, such coatings may be easily removed by typical wear and tear through the use of the cooking appliance.

These problems and others are addressed by the present invention, a first exemplary embodiment of which comprises a home cooking appliance including a housing having a cooking cavity, a door movable between a closed state and an open state for providing access to an opening of the cooking cavity, the door having a glass surface facing an interior of the cooking cavity when the door is in the closed state, at least a portion of the door being configured to be retractable into a position adjacent to a wall of the cooking cavity upon moving the door into the open state, and a surface cleaning mechanism on the housing and configured to remove debris from at least a portion of the glass surface during at least one of a retraction of the door into the position adjacent to the wall of the cooking cavity and an extraction of the door from the position adjacent to the wall of the cooking cavity.

In this way, the present invention can reduce, minimize, or eliminate (e.g., automatically reduce, minimize, or eliminate) a buildup of grease/film/debris on the glass surface of a door of a home cooking appliance, and particularly, on the glass surface of a door of a home cooking appliance having a so-called retractable door that is configured to be retracted into, or deployed from, a body or cabinetry of the appliance, thereby improving the visibility through the door glass while minimizing a need for a user to perform more time consuming and burdensome manual, chemical, pyrolytic, or steam cleaning methods. In a home cooking appliance having a vision system, the present invention may improve the visibility through the door glass thereby improving functionality, capabilities, and/or performance of a camera system of a vision system configured to view through the door glass. The present invention can clean (e.g., automatically clean) a surface of the door glass when the door is opened (and/or closed), such as every time the door is opened (and/or closed), thereby reducing the opportunity for debris to build up or "bake in" on the surface of the door glass over multiple cooking cycles. The present invention can clean (e.g., automatically clean) a surface of the door glass with minimal user intervention or effort, or without any user intervention or effort, and/or without even being apparent or visible to the user.

The invention is not limited to an appliance having any particular type of retractable door system. In some examples, a retractable door system can include a door that folds or hinges down and retracts, for example, under the cooking cavity of the appliance when opening the door. In other examples, a retractable door system can include one or more side swinging doors that retract and stow away along one or more sides of the cooking cavity. In some examples, the appliance can include a single side swinging door. In other examples, the appliance can include a "French door" style having two side swinging doors that open to both sides of the opening of the cooking cavity and retract and stow away along the sides of the cooking cavity. In still other examples, the appliance can include one or more folding and retracting doors, such as bi-fold or garage style doors. Depending on the configuration of the doors, the doors can be hinged on the side, top, and/or bottom of the body or cabinetry, or more particularly, on the side, top, and/or bottom of the cooking cavity, and retractable and stowed away along one or more sides of the cooking cavity and/or one or more of the top and bottom of the cooking cavity.

The invention also is not limited to any particular type of stowing system for the retractable door system. In some examples, one or more doors of the retractable door system can be configured to retract into the body or cabinetry of the appliance, such as into one or more cavities or pockets formed in the body or cabinetry along a top, bottom, and/or side of the body or cabinetry. In other examples, the one or more doors of the retractable door system can be configured to retract into a position adjacent to the body or cabinetry of the appliance, such as adjacent to a top, bottom, and/or side of the body or cabinetry. In these examples, a pocket may be formed external to the body of the appliance and between the body of the appliance and an adjacent kitchen component, such as wood cabinetry, another appliance, a kitchen wall, etc.

The exemplary embodiments of the invention can include a cleaning mechanism (e.g., an automatically applied cleaning mechanism) that cleans a surface of the inner glass of a door while the door is retracting, for example, into the body of the appliance during an opening operation, and/or while the door is extracting or deploying, for example, from the body of the appliance during a closing operation. As the door retracts (or extracts), a cleaning mechanism can contact, or be made to come into contact with, a surface of the door glass to clean debris from the surface of the door glass by scraping, rubbing, abrading, etc. the debris from the surface of the door glass.

The cleaning mechanism can include, for example, a contact surface or surface cleaning element such as a blade, squeegee, and/or abrasive material, or the like. The surface cleaning element can include, for example, a single blade, squeegee, and/or abrasive material, or a plurality of blades, squeegees, and/or abrasive materials. One of ordinary skill in the art will recognize that the cleaning mechanism can include other types of contact surfaces or surface cleaning elements suitable for removing debris from the surface of the door glass, such as a wedge-shaped contact surface, one or more wires, cables, bands, or the like, one or more rollers, tumblers, brushes, or the like, or other surfaces or devices configured to contact and clean the surface of the door glass.

The area of contact of the cleaning mechanism on the surface of the glass can be comprised of a single part or component (such as a single razor blade) or a plurality of parts or components working in parallel or series (such as a plurality of layers deep of blades or squeegees). The area of contact of the cleaning mechanism on the surface of the glass can extend in a direction perpendicular to the direction of motion of the door during retraction or extraction, or in a direction other than a direction perpendicular (e.g., at an angle) to the direction of motion of the door during retraction or extraction, which may thereby assist with guiding the removed debris toward one or more sides of the cavity or pocket, for example, for collection or cleaning from the cleaning mechanism.

In some examples, the contact surfaces or surface cleaning elements of the cleaning mechanism can include a combination of different types of engagement features for contacting the surface of the glass, including, for example, a scraping mechanism such as a razor blade, an abrasive material or pad such as a Scotch-brite™ pad, or a wiping mechanism such a squeegee or windshield wiper material, or a combination of any of these materials, among others.

The cleaning mechanism can be configured, for example, to assert or apply a force across the surface of the door glass. In some examples, the cleaning mechanism can be configured to assert or apply a substantially fixed or equal force across the surface of the surface of the door glass during movement of the door. In other examples, the cleaning mechanism can be configured to assert or apply a substantially different or unequal force across the surface of the surface of the door glass during movement of the door, such as depending on a position of the door with respect to the retracting and/or extracting operation. For example, one or more parts of the cleaning mechanism can be configured to assert or apply an increasingly greater amount of force across the surface of the surface of the door glass as the door is moved in the direction of retraction and/or extraction. In other examples, the cleaning mechanism can include a plurality of parts, one or more of which can be configured to assert or apply a different amount of force across the surface of the surface of the door glass as the door is moved in the direction of retraction and/or extraction, or with respect to different areas of the door glass, etc. The cleaning mechanism may be subject to a force (e.g., biasing force) to press at least a portion of the cleaning mechanism against the surface of the glass, such as one or more of a spring (e.g., linear or rotational spring), weight/gravity, cam, electrical motor, hydraulics or any other devices and methods of forcing two items together. The method of applying force can be configured so that a force is only applied when the door is moving in one direction, or both, and may be designed so that the mechanism applies a force to the surface of the glass only during a portion of motion of the door and removing that force at a later point in the progression.

In some examples, the cleaning mechanism can be configured to contact a surface of the door glass to remove debris from the surface when the door is retracted (e.g., pulled or pushed into the housing) to an open state providing access to the cooking cavity and/or extracted/deployed (e.g., pulled or pushed out of the housing) to return the door to a closed state in which access to the cooking cavity is closed. A part of the cleaning mechanism can be configured to contact a surface of the door glass to remove debris from the surface when the door is moved in only a single direction (e.g., retracted or extracted) or in multiple directions (e.g., retracted and extracted). In some examples, the cleaning mechanism can include a plurality of parts configured to contact a surface of the door glass to remove debris from the surface of the door glass when the door is moved in only a single direction (e.g., retracted or extracted) or in multiple directions (e.g., retracted and extracted). For example, the cleaning mechanism can include one or more parts configured to contact a surface of the door glass to remove at least a portion of the debris from the surface of the door glass when the door is retracted and/or one or more parts configured to contact a surface of the door glass to remove at least a portion of the debris from the surface of the door glass when the door is extracted.

In some examples, the cleaning mechanism can be configured to contact a surface of the door glass to remove a portion of the debris from the surface of the door glass when the door is retracted and/or extracted/deployed, or to remove substantially all of the debris from the surface of the door glass when the door is retracted and/or extracted. For example, the cleaning mechanism can be configured to contact a surface of the door glass to remove a portion of the debris from the surface of the door glass when the door is retracted and/or extracted/deployed such that the surface is gradually cleaned over a plurality of repetitions of retracting and extracting the door. In other examples, the cleaning mechanism can be configured to contact a surface of the door glass to remove all, or substantially all, of the debris from the surface of the door glass when the door is retracted and/or extracted (e.g., through a single opening and closing operation) such that the surface is cleaned, or substantially cleaned over a single operation of retracting and/or extracting the door.

In some examples, the cleaning mechanism can be configured to clean the entirety of the inner glass surface of the door glass, or only one or more portions of the inner glass surface of the door glass, such as one or more locations where visibility or a clean surface is of higher importance, such as a location through which a vision system of the appliance is configured to view through the door glass into the cooking cavity.

All or part of the cleaning mechanism can have a fixed position, or all of part of the cleaning mechanism can be moveable, such as rotatable with respect to the surface of the glass, and/or movable toward or away from the surface of the glass in a direction that is not parallel to a plane of the surface of the glass, and/or movable (e.g., translatable) in a direction parallel to a plane of the surface of the glass.

To keep the cleaning mechanism from being accidentally accessed by the consumer (especially important in the instance of a scraper blade that could cause injury), in some examples of the cleaning mechanism, such as scraper blade or razor blade, a part of the cleaning mechanism, such as a contact surface or surface cleaning element, may be configured to retract or withdraw (e.g., automatically retract or withdraw) into a concealed area (e.g., an area not accessible to a user or a user's fingers or visible to a user) while the door is closed or fully opened, such that the contact surface or surface cleaning element of the cleaning mechanism only selectively extends to apply pressure to the surface of the glass during the cleaning process (e.g., when the door is retracting into, or being extracted from, the housing). The contact surface or surface cleaning element of the cleaning mechanism may be configured to be actuated, for example, to extend, pivot, or be lowered into place, to contact the surface of the glass and exert the force needed to clean the surface of the glass during the cleaning process (e.g., only during the cleaning process). The cleaning mechanism can include an actuator configured to actuate the surface cleaning element or another part of the cleaning mechanism by mechanical means, such as by a mechanical linkage, gear, gear train, etc. in response to the motion of the door (e.g., retracting and/or extracting motion) or components of the door, such as the door hinges, track, slides, etc. In other examples, the cleaning mechanism can include an actuator configured to actuate the surface cleaning element or another part of the cleaning mechanism by other means, such as by electrical means that actuates the movement of a part of the cleaning mechanism in response to the motion of the door (e.g., retracting and/or extracting motion) or a sensing, using a sensor, of the motion of the door, etc., or a combination of mechanical and electrical means.

The cleaning mechanism may be subject to a force (e.g., a biasing force providing by a linear or rotational spring, weight/gravity, cam, electrical motor, hydraulics or any other devices and methods of forcing two items together) to selectively press at least a portion of the cleaning mechanism (e.g., a contact surface or surface cleaning element) against the surface of the glass only during the cleaning process. The method of applying force can be configured so that a force is only applied when the door is moving in one direction, or both, and may be designed so that the mechanism applies a force to the surface of the glass only during a portion of the range of motion of the door and removing that force at a later point in the progression.

In other examples, all or a part of the cleaning mechanism can be configured to be removable such that, for example, a new blade, squeegee, abrasive material, or the like, may be affixed and the debris that has been cleaned off the glass may be removed from the appliance. In still other examples, the appliance can include one or more debris collection devices, such as one or more grease traps configured to allow the debris being removed from the surface of the door glass to be moved off of the cleaning mechanism and into the grease trap such that the debris may be collected and/or discarded without having to replace the complete cleaning mechanism or without having to manually clean the debris from the cleaning mechanism.

In some examples, the cleaning mechanism may be configured to "self-clean" itself, for example, using an additional wiping mechanism or element configured to remove a buildup of debris from the contact surface or surface cleaning element of the cleaning mechanism (such as scraping off the edge of a razor blade) and convey the buildup of debris into a waste trap. In other examples, the cleaning mechanism may include a drainage mechanism or arrangement configured to allow the debris to naturally, or with assistance of an external system such as a heater, remove the debris from the cleaning mechanism into the waste trap.

For purposes of this invention, "a retractable door system" generally means a door system having at least one door that folds or hinges to permit access to the cooking cavity and then can be retracted into, or alongside, the body or cabinetry of the appliance in a position adjacent to a wall of the cooking cavity. For purposes of this invention, "a position adjacent to a wall of the cooking cavity" generally means that at least a portion of the door is positioned alongside at least one of a top wall, bottom wall, or side wall of the cooking cavity and at least partially rearward of a plane of a front opening of the cooking cavity, such as in a cavity or pocket in the body of the appliance. One of ordinary skill in the art will understand that other elements of the appliance may be disposed between the portion of the door and the top wall, bottom wall, or side wall of the cooking cavity, such as an insulation layer or other components. In some examples, only a portion of the door is positioned alongside at least one of a top wall, bottom wall, or side wall of the cooking cavity and at least partially rearward of a plane of a front opening of the cooking cavity, such as a portion of the door having the glass surface to be cleaned, or substantially all of the door is positioned alongside at least one of a top wall, bottom wall, or side wall of the cooking cavity and at least partially rearward of a plane of a front opening of the cooking cavity, such as the entire portion of the door with the exception of the part of the door having a door handle.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 15A is a schematic partial side view of a home cooking appliance having a cleaning mechanism, according to an exemplary embodiment of the invention;

FIG. 15B is a schematic partial side view of a home cooking appliance having a cleaning mechanism, according to an exemplary embodiment of the invention;

FIG. 16A is a schematic partial side view of a home cooking appliance having a cleaning mechanism, according to an exemplary embodiment of the invention;

FIG. 16B is another schematic partial side view of the home cooking appliance of FIG. 16A;

FIG. 17A is a schematic partial side view of a home cooking appliance having a cleaning mechanism, according to an exemplary embodiment of the invention;

FIG. 17B is another schematic partial side view of the home cooking appliance of FIG. 17A;

FIG. 18A is a schematic partial side view of a home cooking appliance having a cleaning mechanism, according to an exemplary embodiment of the invention;

FIG. 18B is another schematic partial side view of the home cooking appliance of FIG. 18A;

FIG. 19A is a schematic partial side view of a home cooking appliance having a cleaning mechanism, according to an exemplary embodiment of the invention;

FIG. 19B is another schematic partial side view of the home cooking appliance of FIG. 19A;

FIG. 20A is a schematic partial top view of a home cooking appliance having a cleaning mechanism, according to an exemplary embodiment of the invention;

FIG. 20B is another schematic partial top view of the home cooking appliance of FIG. 20A;

FIG. 22A is a schematic partial side view of a home cooking appliance having a cleaning mechanism, according to an exemplary embodiment of the invention; and FIG. 22B is a schematic partial top view of a home cooking appliance having a cleaning mechanism, according to an exemplary embodiment of the invention.

DETAILED DESCRIPTION OF THE EXEMPLARY EMBODIMENTS OF THE INVENTION

Figure 1:
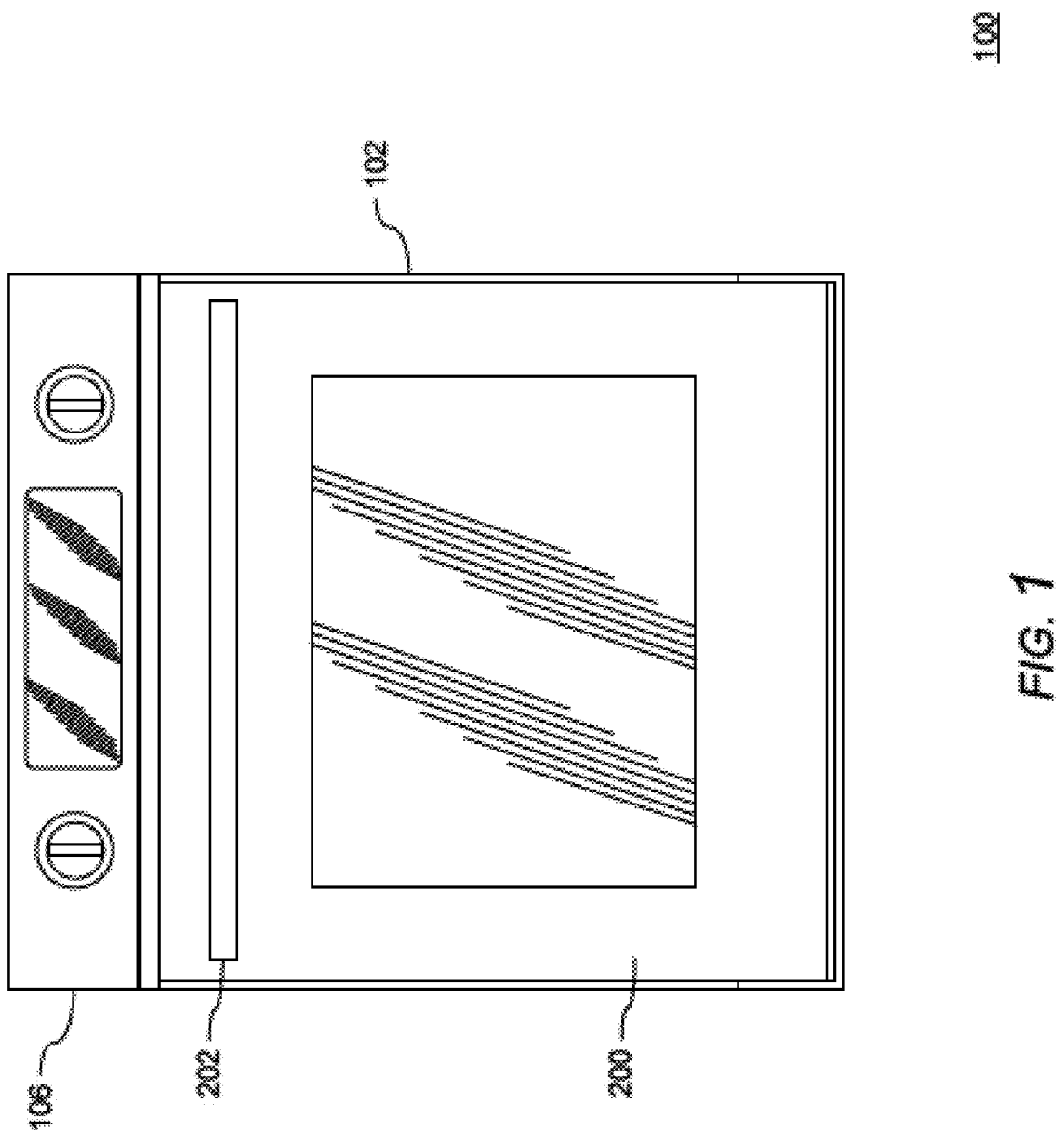
FIG. 1 is a front view of a home cooking appliance, according to an exemplary embodiment of the invention.
Figure 2:
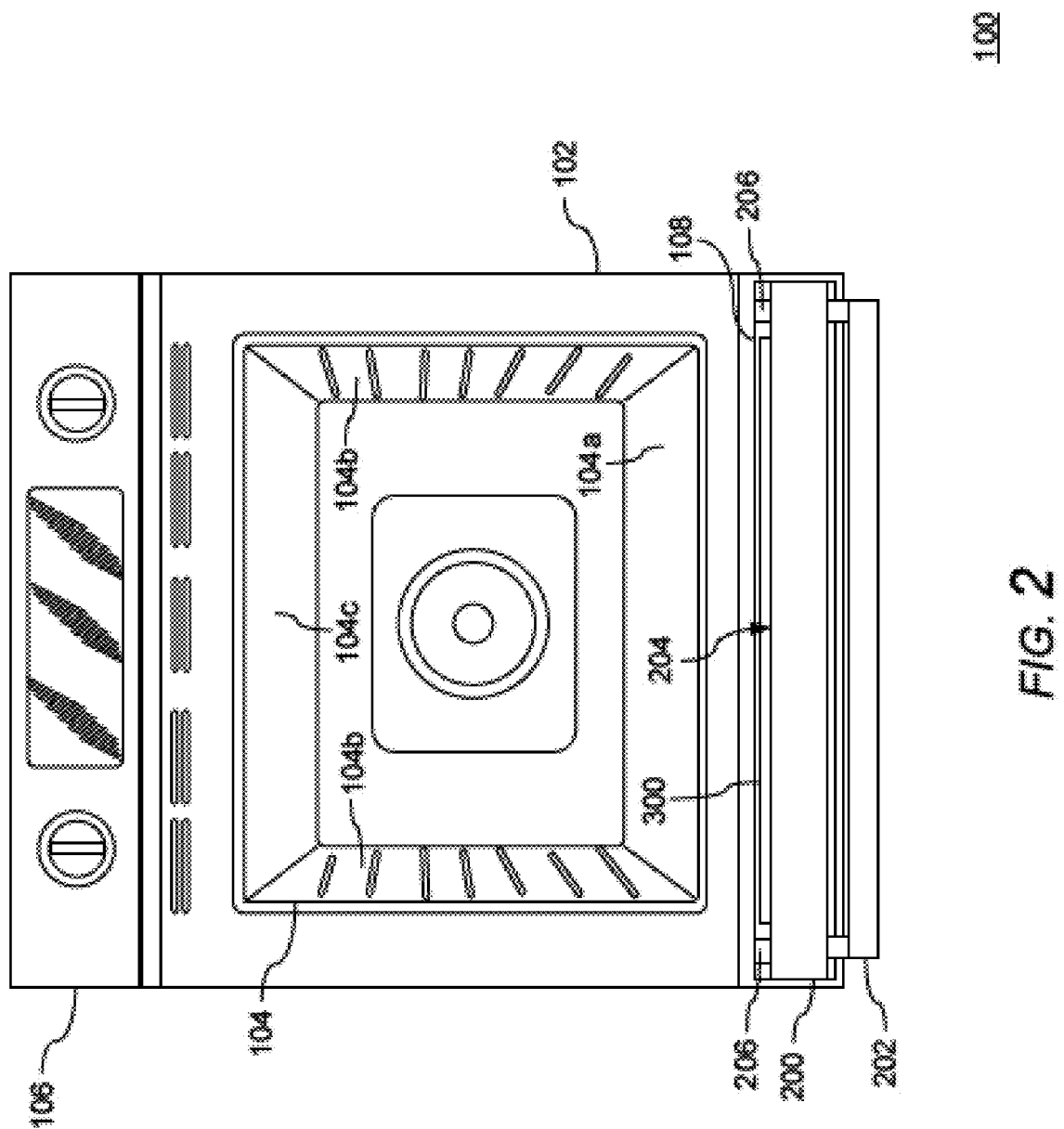
FIG. 2 is a schematic front view of the home cooking appliance of FIG. 1 with the door in an open state.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

With reference to FIGS. 1-22B, exemplary embodiments of a home cooking appliance according to the invention will now be described.

A home cooking appliance 100 according to the invention can include, for example, a standalone appliance, wall mounted appliance, such as a stand-alone oven, wall mounted oven, double oven, combination oven, countertop oven, microwave oven, air fryer, or a freestanding range having one or more gas or electric cooking or warming devices, such as an oven, steam oven, convection oven, and/or warming drawer. With reference to FIGS. 1-5, an example of a household cooking appliance 100 can include, for example, a housing 102 having a cooking cavity or compartment 104 (e.g., an oven cavity) accessible through an opening, a door 200 covering the opening and moveable about one or more hinges 206 between an open state and a closed state, and a control panel 106 having a user input device for controlling operation of one or more gas or electric burners or heating elements, circulating fans, etc. in the cooking cavity 104 for performing a preheat operation, cooking operation, warming operation, etc. The cooking cavity 104 can include a plurality of walls, including a bottom wall 104a, sidewalls 104b, top wall 104c, and a rear wall. The user input device 106 can include a controller and one or more control knobs, touch sensitive input devices, etc. for controlling operation of the appliance 100. One or more oven racks (not shown) or other support devices can be provided within the cooking cavity 104. The door 200 can include one or more door handles 202 and door glass for viewing into the cooking cavity 104. An inner surface of the door can include a glass surface 204 facing the cooking cavity 104 that is exposed to grease, smoke and/or food debris during a cooking operation of the appliance. One of ordinary skill will recognize that other configurations are possible.

Figure 6:
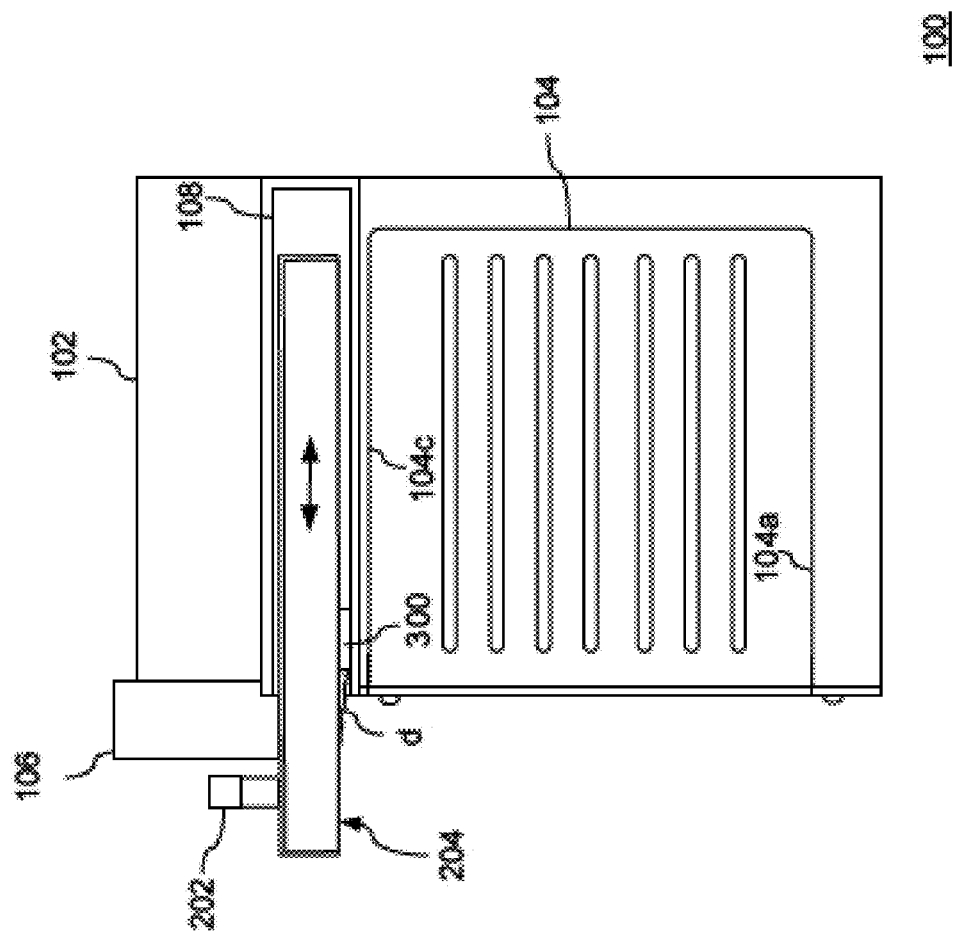
FIG. 6 is a schematic side view of a home cooking appliance, according to an exemplary embodiment of the invention.
Figure 7:
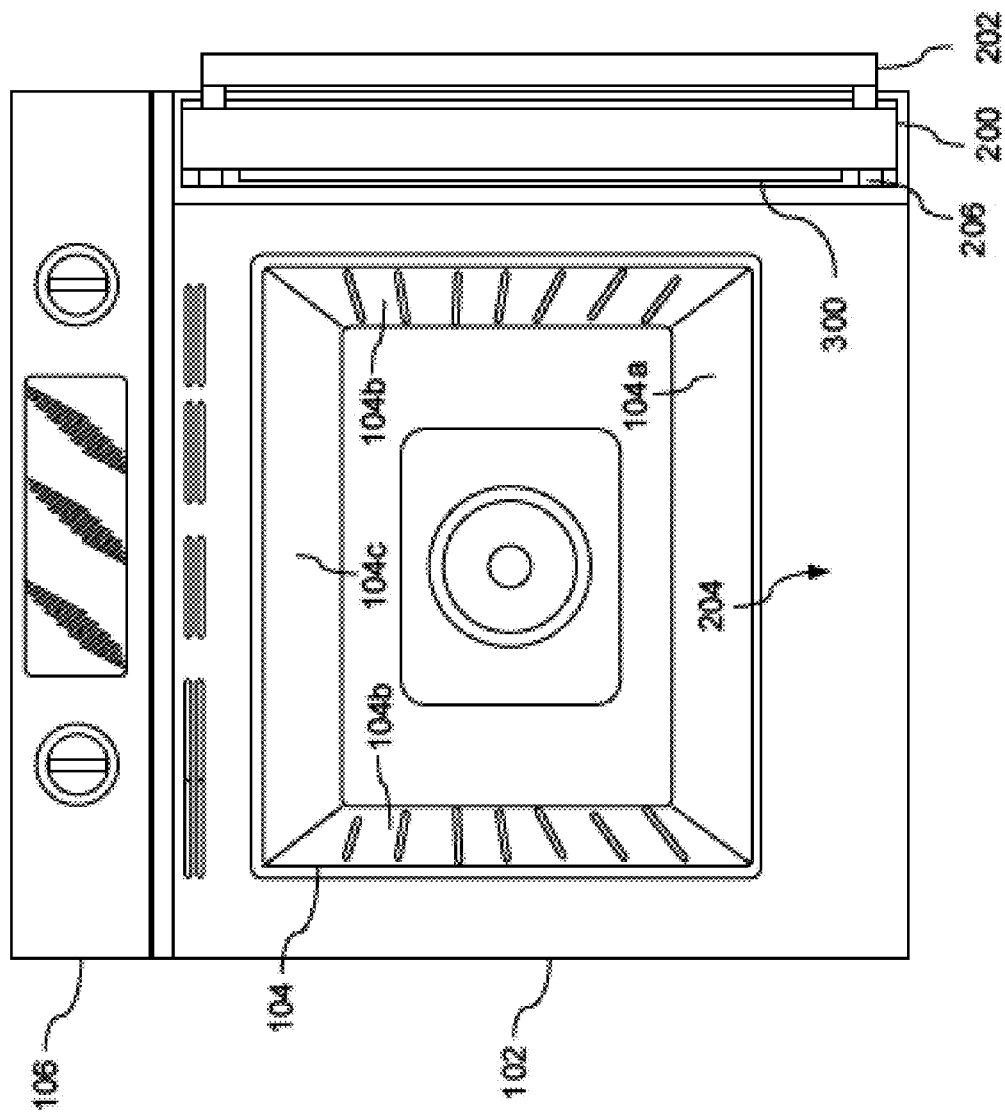
FIG. 7 is a schematic side view of a home cooking appliance, according to an exemplary embodiment of the invention.
Figure 8:
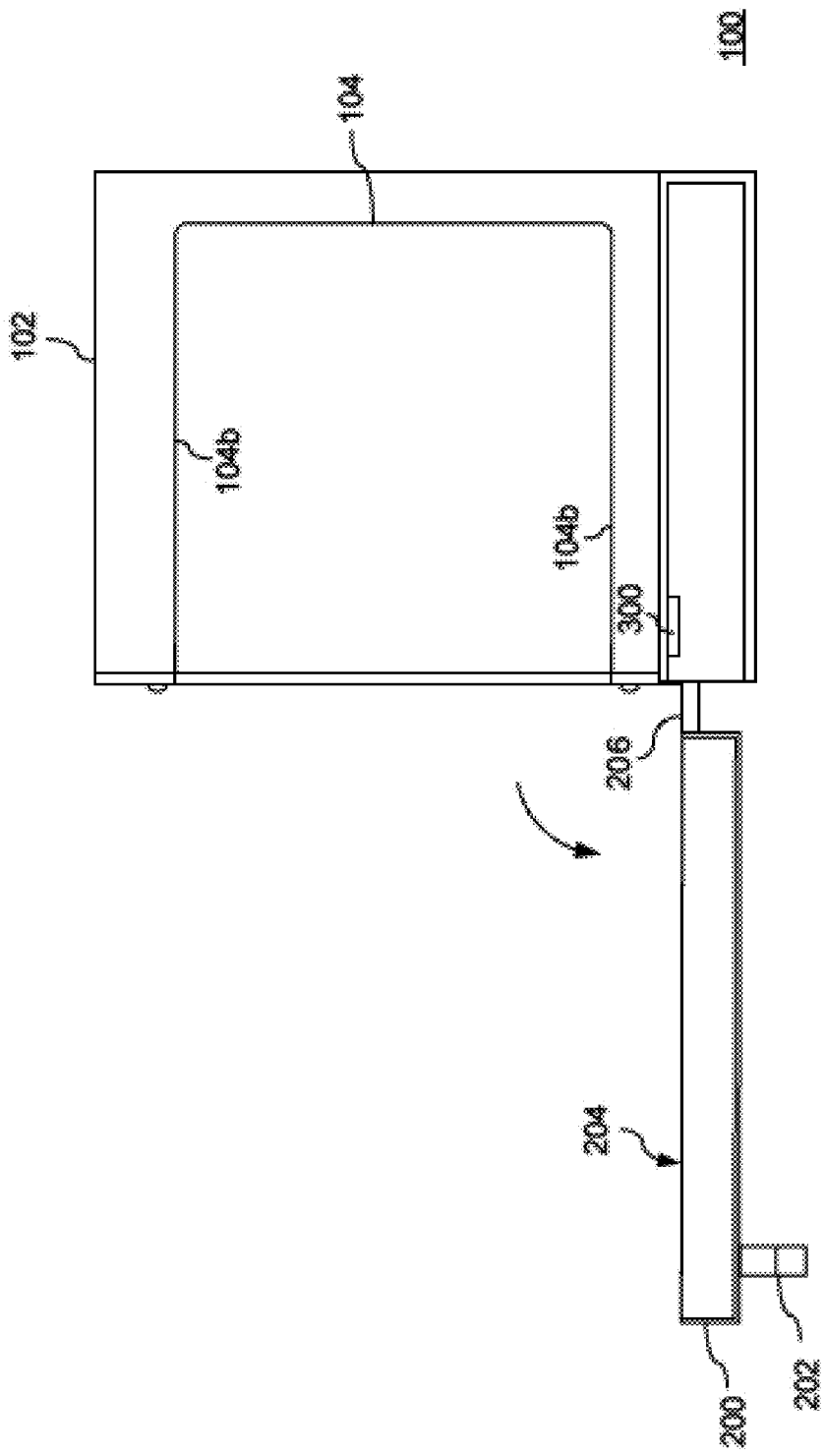
FIG. 8 is a schematic top view of the home cooking appliance of FIG. 7.
Figure 9:
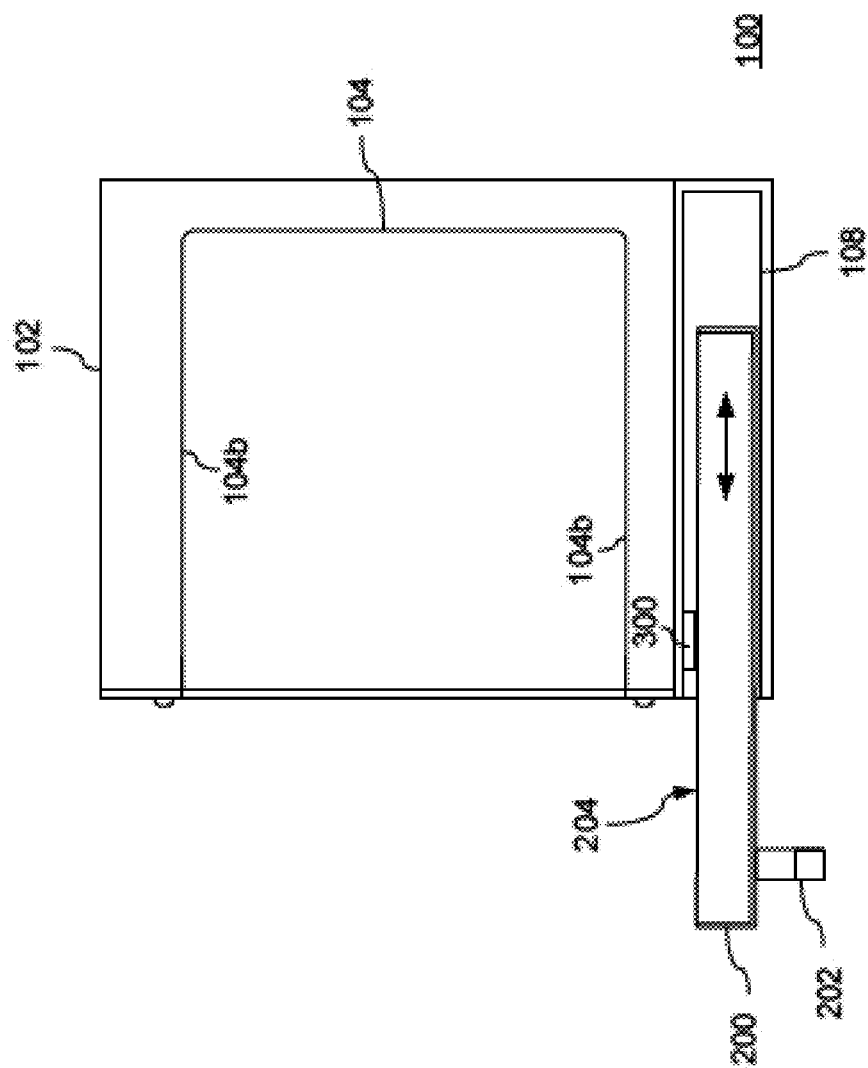
FIG. 9 is another schematic top view of a home cooking appliance of FIG. 7.
Figure 10:
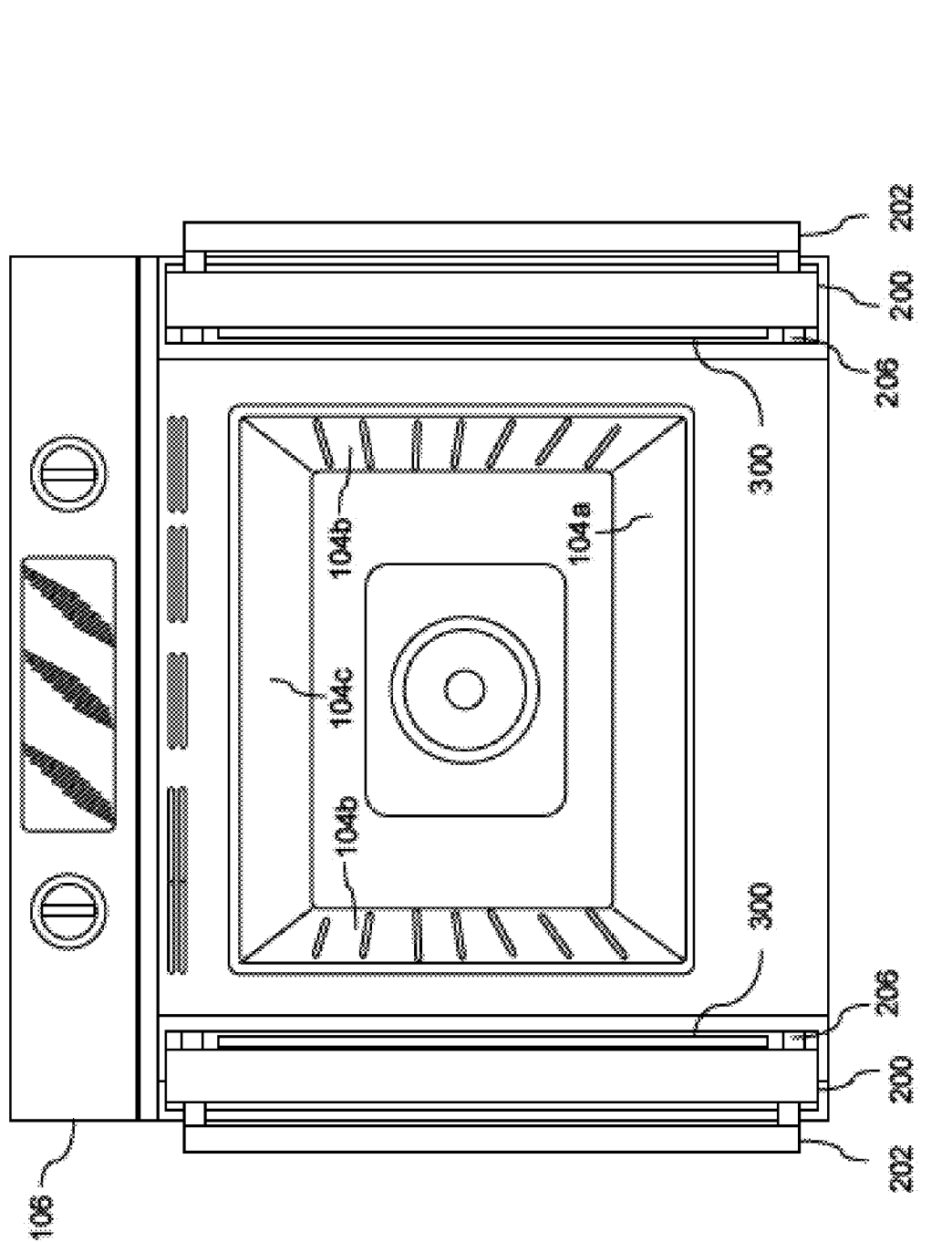
FIG. 10 is a schematic front view of a home cooking appliance, according to an exemplary embodiment of the invention.
Figure 11:
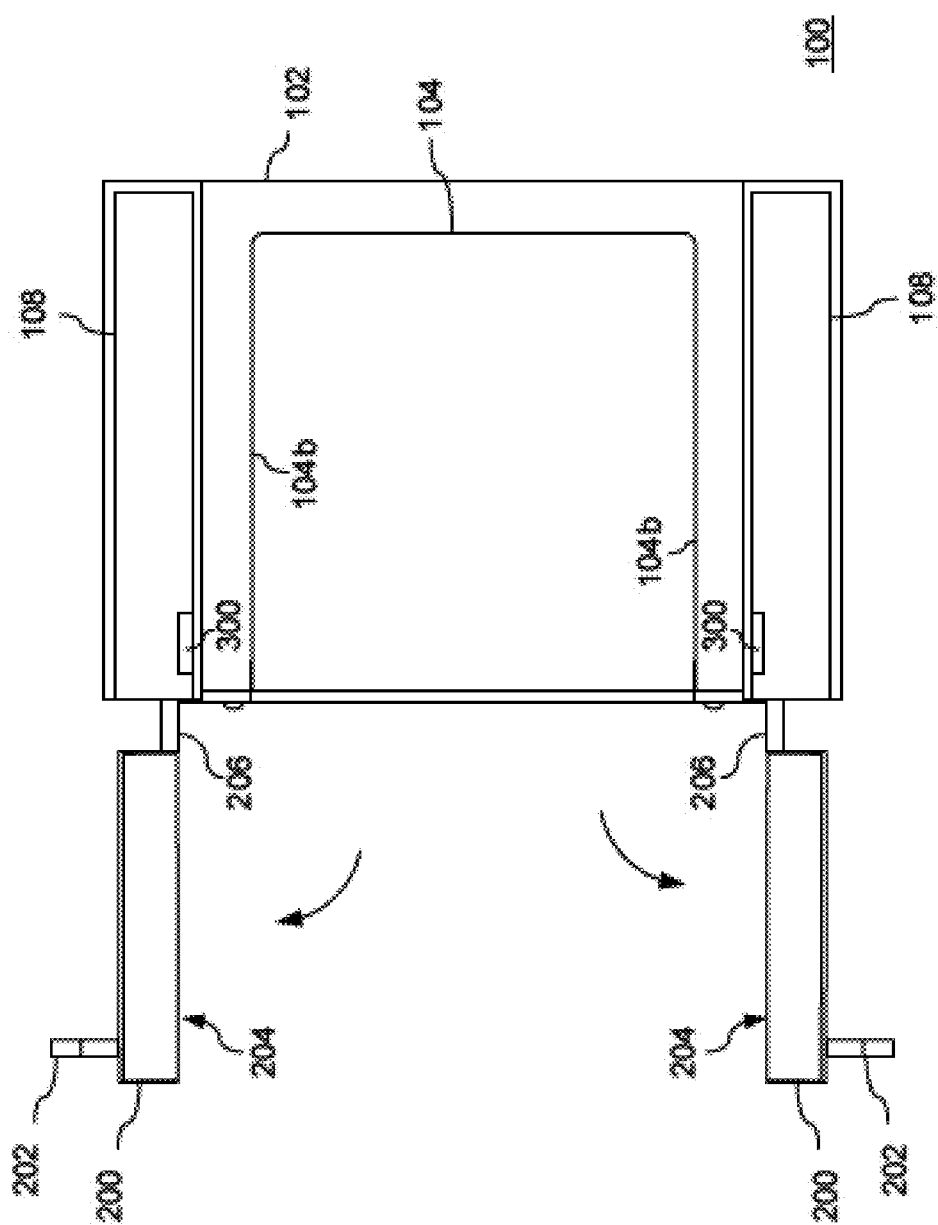
FIG. 11 is a schematic top view of the home cooking appliance of FIG. 10.
Figure 12:
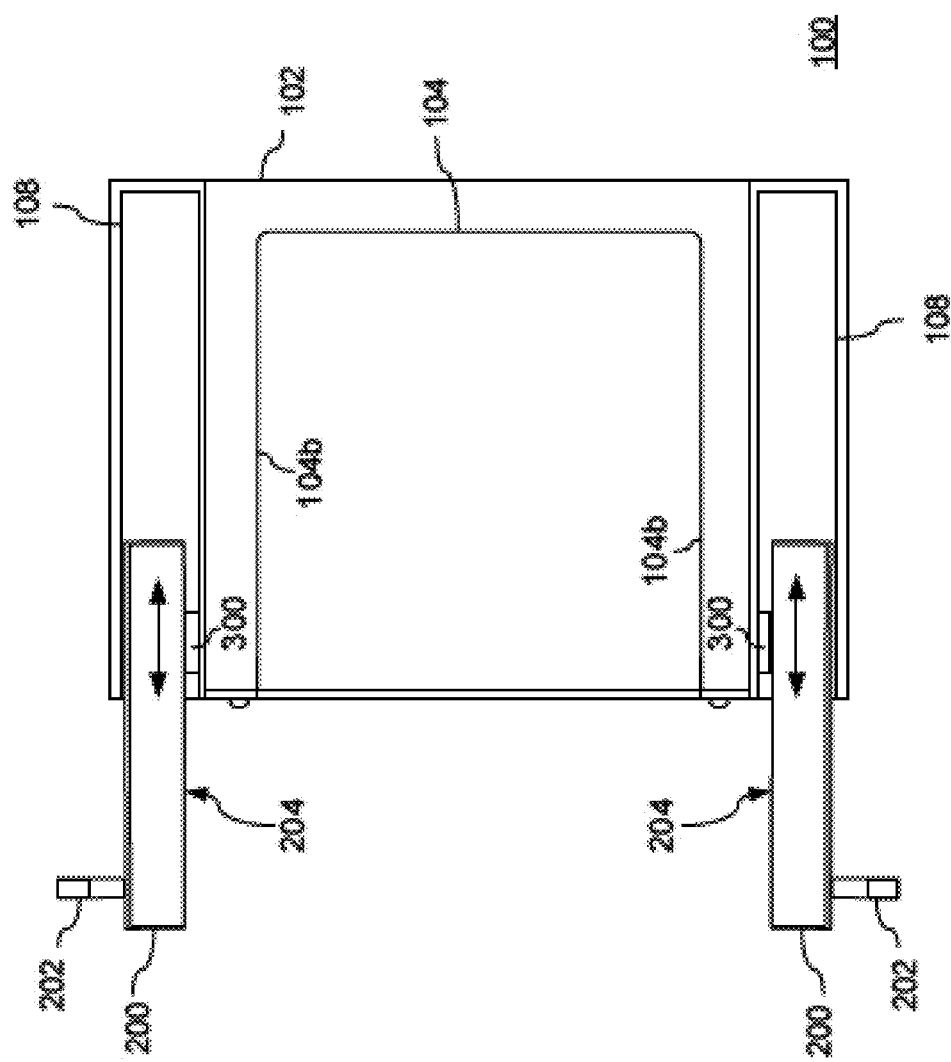
FIG. 12 is another schematic top view of a home cooking appliance of FIG. 10.

The home cooking appliance 100 can include a door 200 configured to be retractable, at least in part, into a position adjacent to a wall (e.g., 104a, 104b, 104c) of the cooking cavity 104 upon moving the door 200 into the open state. The invention is not limited to an appliance having any particular type of retractable door system. For example, FIGS. 2-5 illustrate an example of a retractable door system in which the door 200 folds or hinges down and retracts under the cooking cavity 104 of the appliance when opening the door 200. FIG. 6 illustrates an example of a "garage door" style retractable door system in which the door 200 folds or hinges up and retracts above the cooking cavity 104 of the appliance when opening the door 200. FIGS. 7-9 illustrate an example of a retractable door system including a side swing door 200 that retracts and stows away along a sidewall 104b of the cooking cavity 104. FIGS. 10-12 illustrate an example of a retractable door system including "French door" style side swinging doors that open to both sides of the opening of the cooking cavity 104 and retract and stow away along the sidewalls 104b of the cooking cavity 104. One of ordinary skill will recognize that other configurations are possible, such as "bi-fold" style doors. Depending on the configuration of the door or doors 200, the door 200 can be hinged via one or more hinges 206 on the side, top, and/or bottom of the body 102. The hinges 206 can be configured to permit the door 200 to rotate from a closed position into an open position, and vice versa, and also to translate into and out of a stowed position adjacent to a wall (e.g., 104a, 104b, 104c) of the cooking cavity 104 (e.g., retract and extract).

With reference again to FIGS. 2-12, the housing 102 can include one or more cavities or pockets 108 along a top, bottom, and/or side of the cooking cavity 104. In other examples, the one or more doors of the retractable door system can be configured to retract into a position adjacent to the housing 102 of the appliance, such as adjacent to a top, bottom, and/or side of the body of the housing 102. In these examples, a cavity or pocket may be formed external to the housing 102 of the appliance, such as between the housing 102 of the appliance and an adjacent kitchen component, such as wood cabinetry, another appliance, a kitchen wall, etc. The invention is not limited to any particular type of stowing system for the retractable door system.

Figure 3:
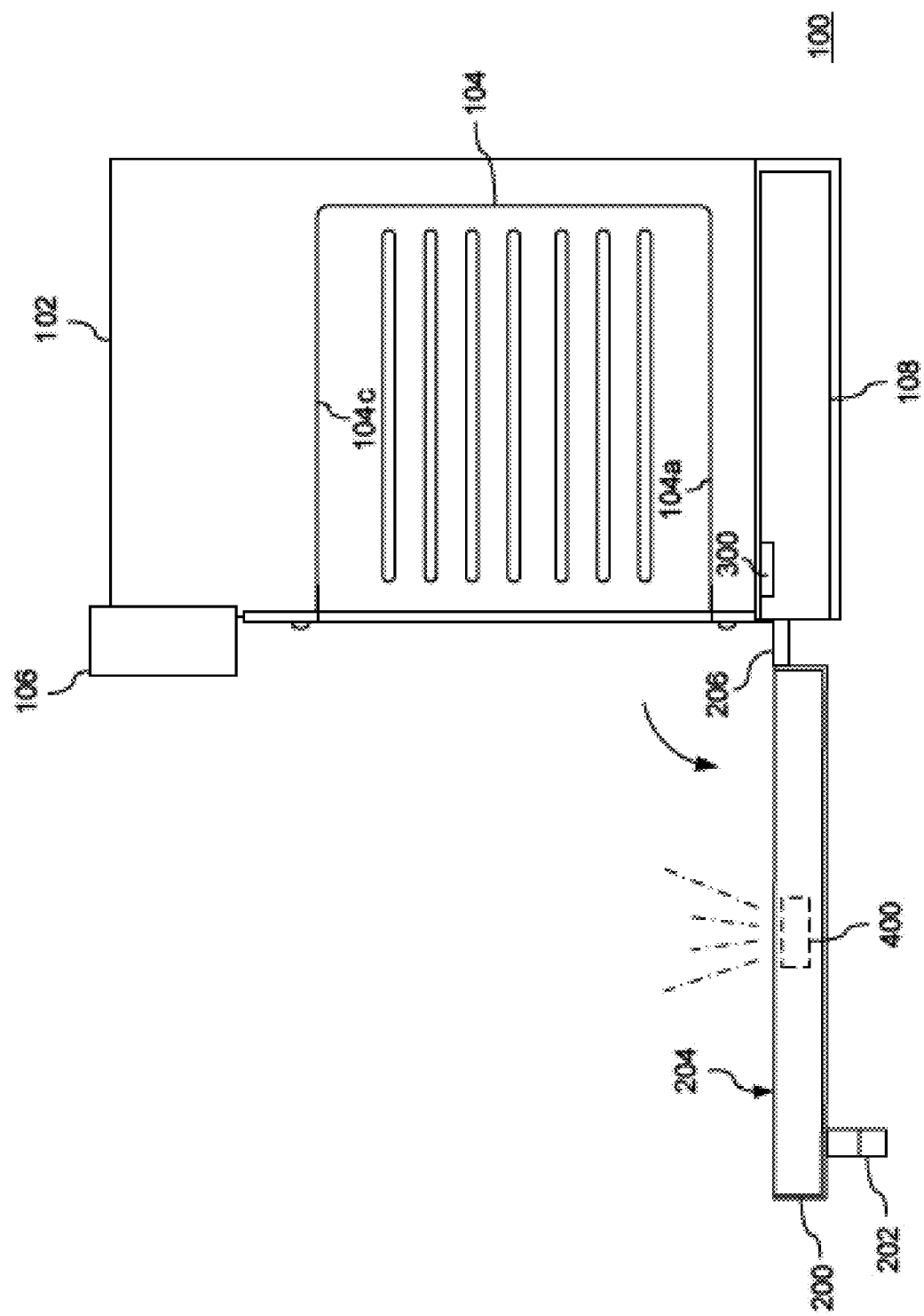
FIG. 3 is a schematic side view of the home cooking appliance of FIG. 1.
Figure 4:
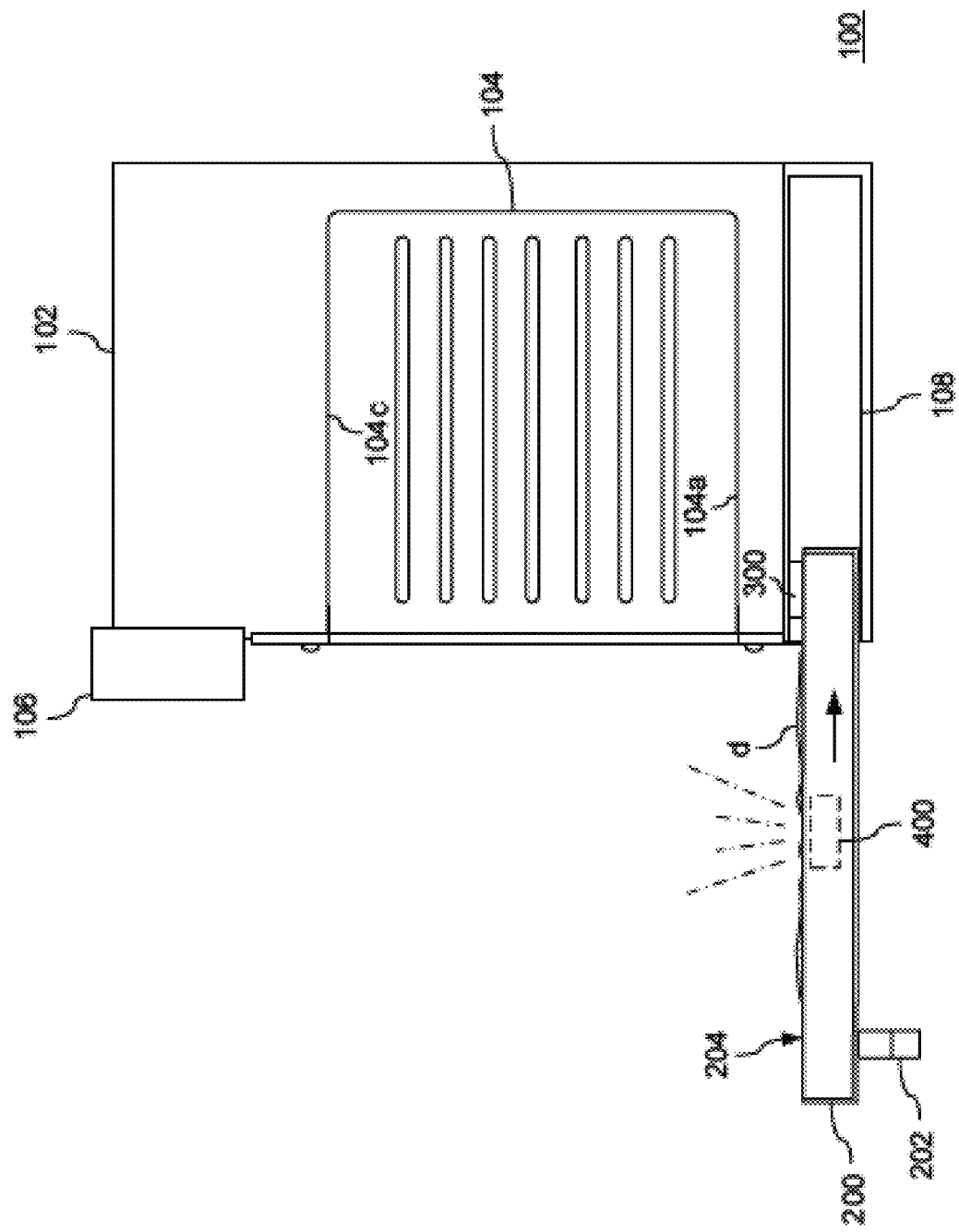
FIG. 4 is another schematic side view of a home cooking appliance of FIG. 1.
Figure 5:
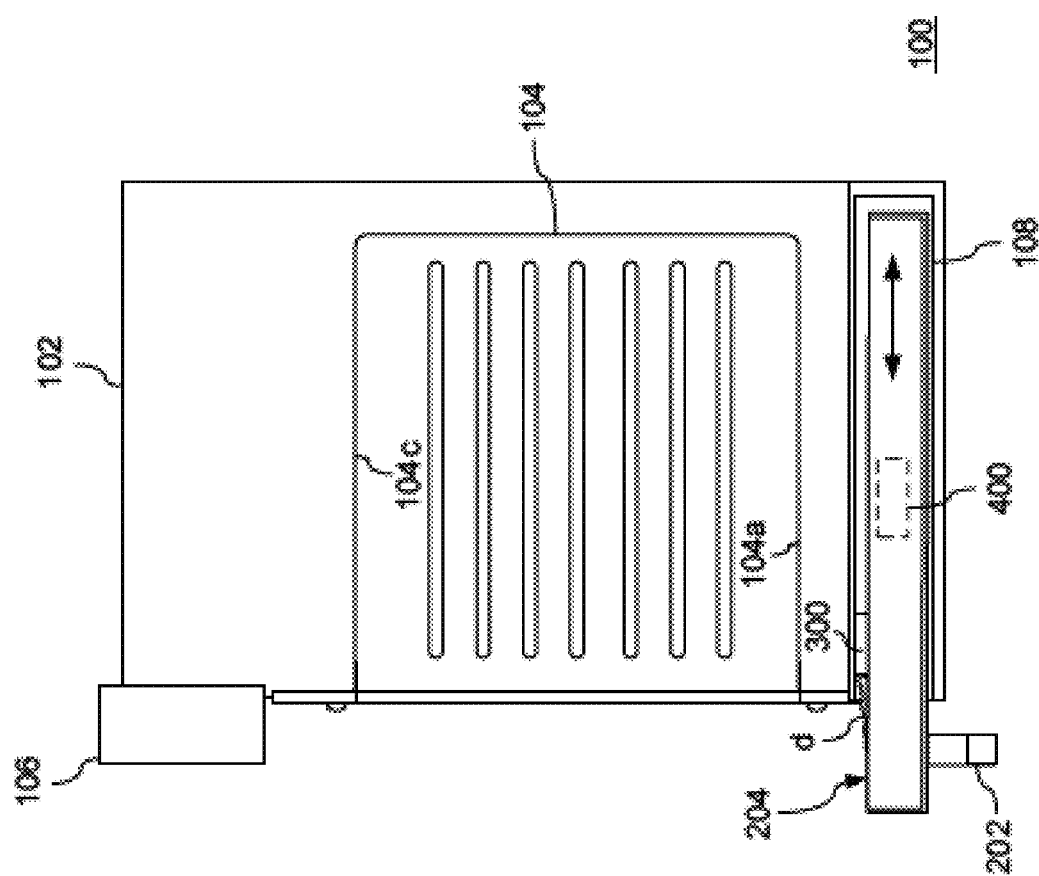
FIG. 5 is another schematic side view of a home cooking appliance of FIG. 1.

As shown in the example illustrated in FIGS. 3-5, the home cooking appliance 100 optionally can include a vision system 400 including, for example, a camera integrated into, or attached to, the door 200 that views into the cooking cavity 104 through the surface 204 of the door glass.

With reference again to FIGS. 2-12, examples of a cleaning mechanism 300 according to the invention will now be described. The exemplary cleaning mechanism 300 can be configured to contact at least a portion of the glass surface 204 of the door 200 to remove debris d from at least a portion of the glass surface 204 during at least one of a retraction of the door 200 into the position adjacent to the cooking cavity 104 and an extraction of the door 200 from the position adjacent to the cooking cavity 104. The cleaning mechanism can be configured to be actuated by a user input (e.g., via the control panel 106) or automatically applied to clean a surface 204 of the inner glass of the door 200 while the door 200 is retracting, for example, into the cavity 108 of the appliance 100, and/or while the door is extracting or deploying, for example, from the cavity 108 of the appliance 100. In operation, as the door 200 retracts (and/or extracts), a portion of the cleaning mechanism 300 can contact, or be made to come into contact with, a surface 204 of the door glass to clean at least a portion of the debris d from the surface 204 of the door glass by scraping, rubbing, abrading, etc. the debris d from the surface 204 of the door glass.

Figure 13A:
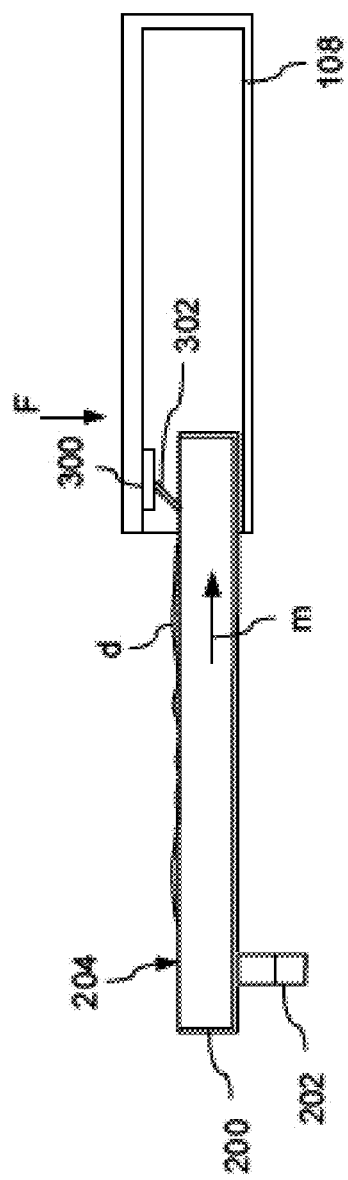
FIG. 13A is a schematic partial side view of a home cooking appliance having a cleaning mechanism, according to an exemplary embodiment of the invention.
Figure 13B:
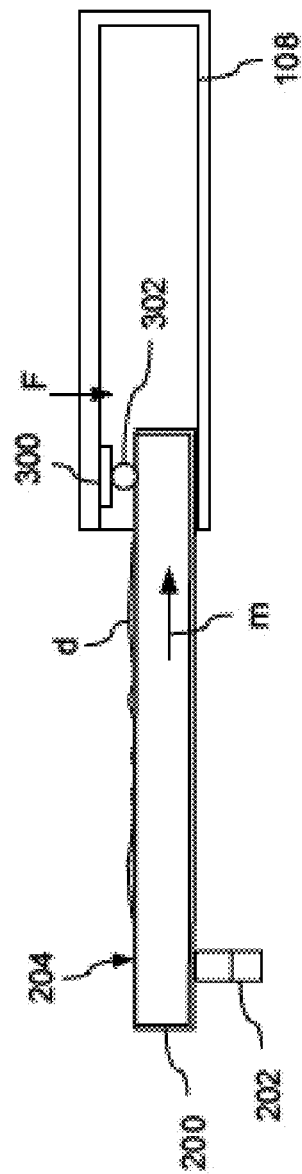
FIG. 13B is a schematic partial side view of a home cooking appliance having a cleaning mechanism, according to an exemplary embodiment of the invention.

With reference to FIGS. 13A-21B, the cleaning mechanism 300 can include various types of contact surfaces suitable for removing debris from the surface 204 of the door glass as the door 200 is retracted and/or extracted from the position adjacent to the cooking cavity 104 (e.g., from the position at least partially within the cavity 108). For example, as shown in FIG. 13A, the cleaning mechanism can include, for example, a surface cleaning element 302 such as a blade, squeegee, and/or abrasive material, or the like. As shown in FIG. 13B, the cleaning mechanism can include a surface cleaning element 302 having another surface or shape configured to remove the debris, such as a wire, cable, or the like, one or more rollers, tumblers, a wedge-shaped contact surface, among other configurations.

Figure 14A:
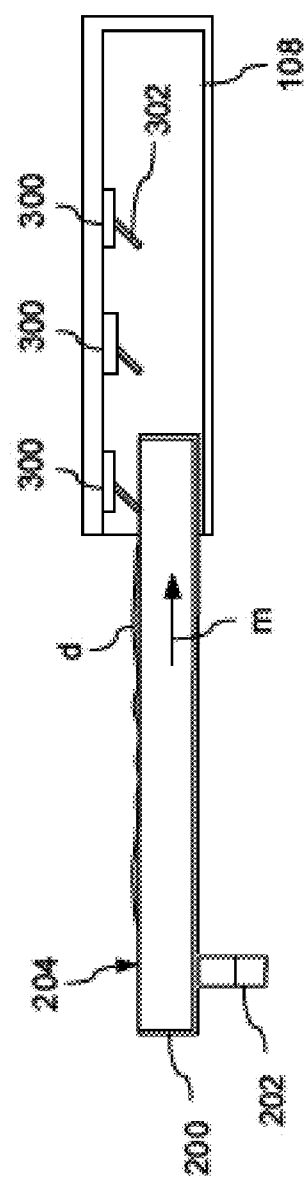
FIG. 14A is a schematic partial side view of a home cooking appliance having a cleaning mechanism, according to an exemplary embodiment of the invention.
Figure 14B:
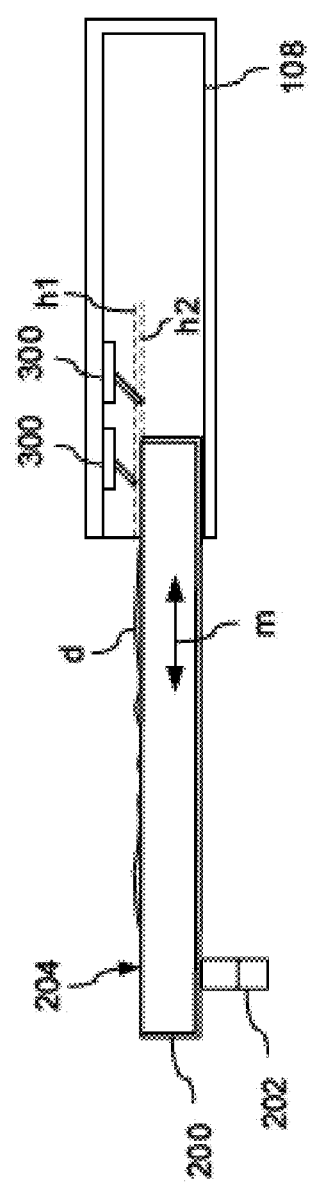
FIG. 14B is a schematic partial side view of a home cooking appliance having a cleaning mechanism, according to an exemplary embodiment of the invention.

As shown in FIGS. 14A and 14B, the surface cleaning elements 302 of the cleaning mechanism 300 can include, for example, a single blade, squeegee, and/or abrasive material, etc., or a plurality of blades, squeegees, and/or abrasive materials, etc. The area of contact of the cleaning mechanism 300 on the surface 204 of the glass can be comprised of a single part or component (such as a single razor blade) or a plurality of parts or components working in parallel or series (such as a plurality of layers deep of blades or squeegees).

The cleaning mechanism 300 can be configured to contact a surface 204 of the door glass to remove debris d from the surface 204 when the door 200 is retracted (e.g., pulled or pushed into the housing) to an open state providing access to the cooking cavity and/or extracted/deployed (e.g., pulled or pushed out of the housing) to return the door to a closed state in which access to the cooking cavity is closed. As shown in the example of FIG. 15A, the cleaning mechanism 300 can include a plurality of surface cleaning elements 302, each being configured to contact a surface 204 of the door glass to remove debris from the surface 204 when the door 200 is moved in only a single direction (e.g., retracted or extracted). In other examples, one or more elements of the cleaning mechanism can be configured to contact a surface 204 of the door glass to remove debris from the surface 204 when the door 200 is moved in multiple directions (e.g., retracted and extracted). For example, the cleaning mechanism 300 can include a combination of different types of surface cleaning elements 302 or other engagement features for contacting the surface of the glass, such as a scraping mechanism such as with a razor blade, an abrasive such as a Scotch-brite™ pad, or a wiping mechanism such a squeegee or windshield wiper material, or a combination of any of elements or materials, as illustrated in the example of FIG. 15B. A combination of the same or different types of surface cleaning elements 302 or engagement features can be provided for contacting the surface of the glass and removing debris depending on the direction of motion m of the door 200.

In other examples, as shown in FIGS. 16A and 16B, a surface cleaning element 302 of the cleaning mechanism 300 (e.g., a part or surface of the cleaning mechanism 300 configured to make direct, physical contact with the surface 204 of the door glass during movement of the door 200) can be configured to be actuated (e.g. automatically actuated), such as rotated, to contact a surface 204 of the door glass to remove debris from the surface 204 when the door 200 is retracted and, in turn, to be actuated (e.g. automatically actuated), such as rotated, to contact a surface 204 of the door glass to remove debris from the surface 204 when the door 200 is extracted in the opposite direction. An actuator (e.g., as schematically illustrated by 304 in FIGS. 16A, 16B) can be provided on the housing 102, or on the cleaning mechanism 300, and configured to actuate the surface cleaning element 302 or another part of the cleaning mechanism 300 by mechanical means, such as by a mechanical linkage, gear, gear train, etc. in response to the motion m of the door (e.g., retracting and/or extracting motion) or components of the door, such as the door hinges, track, slides, etc. In other examples, the cleaning mechanism 300 can include an actuator (e.g., 304) configured to actuate the surface cleaning element 302 or another part of the cleaning mechanism 300 by other means, such as by electrical means that actuates the movement of a part of the cleaning mechanism 300 in response to the motion m of the door 200 (e.g., retracting and/or extracting motion) or a sensing, using a sensor, of the motion m of the door 200, etc., or a combination of mechanical and electrical means.

With reference again to FIGS. 16A-19B, all or part of the cleaning mechanism 300 can have a fixed position, or all of part of the cleaning mechanism 300 can be moveable, such as rotatable with respect to the surface of the glass (FIGS. 16A, 16B or FIGS. 17A, 17B), and/or movable toward or away from the surface of the glass (e.g., translatable) in a direction that is not parallel (e.g., perpendicular) to a plane of the surface of the glass (FIG. 18A, 18B or 19A, 19B), and/or movable (e.g., translatable) in a direction parallel to a plane of the surface of the glass (FIG. 20A, 20B or 21A, 21B).

For example, as shown in the examples illustrated in FIGS. 17A-19B, a part of the cleaning mechanism 300 may be configured to retract or withdraw (e.g., either partially or entirely) into a concealed area (i.e., an area not accessible to, or with minimal accessibility to, a user or a user's fingers) and to be removed from contact with the surface 204 of the glass while the door is closed or fully opened, such that the cleaning mechanism only extends to apply pressure to the surface 204 of the glass during the cleaning process (e.g., when the door is retracting into and/or being extracted from the housing). As shown in the example of FIGS. 17A and 17B, a part (e.g., surface cleaning element such as a scraper) of the cleaning mechanism 300 may be configured, for example, to pivot from an at least partially stowed position (e.g., with a clearance c1 between the cleaning mechanism 300 and the surface 204) into place (e.g., into contact with the surface 204) to exert the force needed to clean the surface of the glass when the door is retracting into and/or being extracted from the housing. As shown in the example of FIGS. 18A, 18B and 19A, 19B, a part (e.g., scraper) of the cleaning mechanism 300 may be configured, for example, to extend, translate, or be lowered from an at least partially stowed position (e.g., with a clearance c1 between the cleaning mechanism 300 and the surface 204) into place (e.g., into contact with the surface 204) to exert the force needed to clean the surface of the glass when the door is retracting into and/or being extracted from the housing. As in FIGS. 16A and 16B, an actuator can be provided on the housing, or on the cleaning mechanism, and configured to actuate the surface cleaning element 302 or another part of the cleaning mechanism 300 by mechanical or electrical means, or a combination thereof. For clarity, such an actuator is not illustrated in FIGS. 17A-19B.

The cleaning mechanism 300 can be configured, for example, to assert or apply a force across the surface of the door glass. In some examples, the cleaning mechanism 300 can be configured to assert or apply a substantially fixed or equal force across the surface of the door glass during movement of the door. In other examples, the cleaning mechanism 300 can be configured to assert or apply a substantially different or unequal force across the surface 204 of the door glass during movement of the door 200, such as depending on a position of the door 200 with respect to the retracting and/or extracting operation. For example, a guide or door slide (not shown) supporting the door 200 during retraction into the cavity 108 can be inclined (e.g., by a predetermined angle or slope) such that the cleaning mechanism 300 presses against the surface 204 of the door glass (or vice versa) by a greater amount as the door 200 moves further into the cavity 108. In another example, with reference again to FIGS. 14A and 14B, a plurality of cleaning mechanisms 300, each applying a different force to the surface 204 of the glass, or each being at a difference height h1, h2 with respect to the surface 204 of the glass, can be provided. As illustrated in the examples of FIGS. 18B and 19B, the cleaning mechanism 300 may be subject to a force F (e.g., biasing force) to press at least a portion (e.g., blade) of the cleaning mechanism 300 against the surface of the glass, such as one or more of a spring (e.g., linear or rotational spring), weight/gravity, cam, electrical motor, hydraulics or any other devices and methods of forcing two items together. The method of applying force can be configured so that a force F is only applied when the door 200 is moving in one direction, or both, and may be designed so that the mechanism applies a force F to the surface 204 of the glass only during a portion of motion of the door 200 and removing that force at a later point in the progression, or such that the mechanism applies a different amount of force F to the surface 204 of the glass at different points in the progression.

Figure 21A:
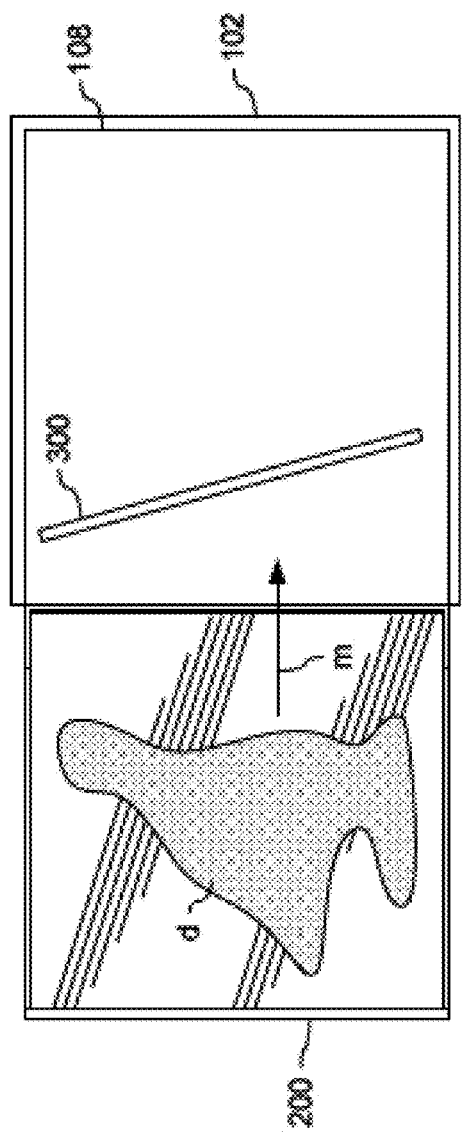
FIG. 21A is a schematic partial top view of a home cooking appliance having a cleaning mechanism, according to an exemplary embodiment of the invention.
Figure 21B:
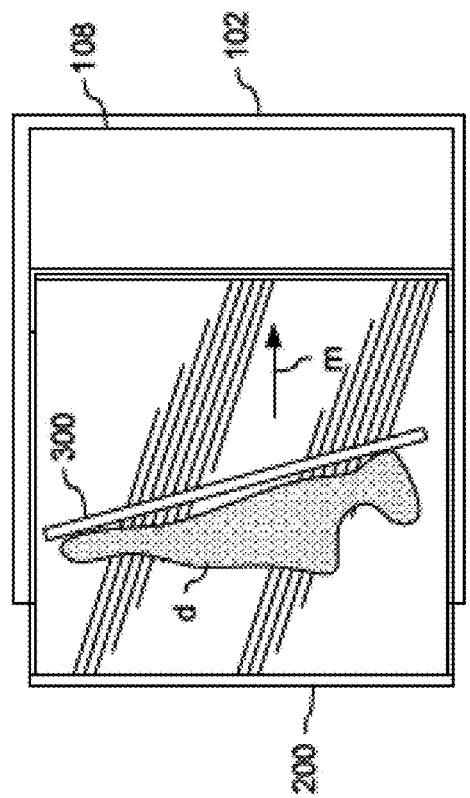
FIG. 21B is another schematic partial top view of the home cooking appliance of FIG. 21A.

In the examples of FIGS. 20A and 20B, the cleaning mechanism 300, or at least a part of the cleaning mechanism 300 (e.g., a blade) can be configured to extend in a direction substantially perpendicular to the direction of motion m of the door 200 during retraction or extraction. In the examples of FIGS. 21A and 21B, the cleaning mechanism 300, or at least a part of the cleaning mechanism 300 (e.g., a blade) can be configured to extend in a direction other than a direction perpendicular (e.g., at an angle) to the direction of motion m of the door 200 during retraction or extraction, which may cause the removed debris d to be directed, at least in part, toward one side of the cavity 108.

In each of the illustrated examples, the cleaning mechanism 300, or at least a part of the cleaning mechanism 300 (e.g., a blade) optionally can be configured to be removable so that, for example, an existing blade, squeegee, abrasive material, or the like, may be removed such that the debris d cleaned off the surface 204 of the glass may be removed from the appliance, and then the part of the cleaning mechanism 300 can be replaced for further use, or a new or replacement part of the cleaning mechanism 300 (e.g., blade, squeegee, abrasive material, or the like) may be affixed.

With reference to examples in FIGS. 22A and 22B, the appliance 100 can include one or more debris collection devices 500, such as one or more grease traps configured to allow the debris d being removed from the surface 204 of the door glass to be moved off of the cleaning mechanism 300 and into the grease trap 500 such that the debris d may be collected and/or discarded without having to replace the complete cleaning mechanism 300 or without having to manually clean the debris d from the cleaning mechanism 300. In some examples, the cleaning mechanism 300 and/or the debris collection device 500 can be configured with an additional wiping mechanism (e.g., an additional scraper, etc.) configured to remove the debris from the cleaning surface of the cleaning mechanism 300 (such as scraping off the edge of a blade) and to direct the debris into a waste trap of the debris collection device 500. For example, as shown in FIG. 22A, a wiping mechanism (e.g., an additional scraper, etc.) can be integrally formed by a part (e.g., an edge) of the debris collection device 500 to guide or scrape the debris and move or guide it into a waste trap portion of the device 500. In other examples, as shown in FIG. 22B, an additional wiping mechanism 306 (e.g., an additional scraper, etc.) can be provided to guide or scrape the debris and move it into the debris collection device 500.

In other examples, the cleaning mechanism may include a drainage mechanism/design configured to allow the debris to naturally, or with assistance of an external system such as a heater, remove the debris from the cleaning mechanism into the waste trap.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A home cooking appliance comprising:
    a housing having a cooking cavity;
    a door for providing access to an opening of the cooking cavity, the door having a glass surface facing an interior of the cooking cavity when the door is in a closed state, at least a portion of the door being configured to be retractable into a cavity adjacent to a wall of the cooking cavity upon moving the door into an open state; and
    one or more surface cleaning mechanisms in the cavity and configured to remove debris from at least a portion of the glass surface in the cavity during at least one of a retraction of the door into the cavity, or an extraction of the door from the cavity, or a combination thereof.

2. The home cooking appliance of claim 1, wherein the one or more surface cleaning mechanisms is configured to automatically remove debris from the portion of the glass surface during at least one of the retraction of the door into the cavity, or the extraction of the door from the cavity, or a combination thereof.

3. The home cooking appliance of claim 1, wherein the one or more surface cleaning mechanisms is configured to remove debris from the portion of the glass surface during both the retraction of the door into the cavity and the extraction of the door from the cavity.

4. The home cooking appliance of claim 1, wherein the one or more surface cleaning mechanisms includes a surface cleaning element configured to contact the portion of the glass surface to remove debris from the portion of the glass surface during movement of the door.

5. The home cooking appliance of claim 4, wherein the surface cleaning element is configured to remove debris from the portion of the glass surface by at least one of scraping, rubbing, wiping, or abrading the debris from the glass surface during movement of the door, or a combination thereof.

6. The home cooking appliance of claim 4, wherein the surface cleaning element includes at least one of a blade, a shaped surface edge, a squeegee, a tumbler, a roller, an abrasive material, a wire, or a cable, or a combination thereof, configured to remove at least a portion of the debris from the glass surface during movement of the door.

7. The home cooking appliance of claim 1, wherein the one or more surface cleaning mechanisms includes a plurality of surface cleaning elements configured to contact the portion of the glass surface to remove debris from the portion of the glass surface during movement of the door.

8. The home cooking appliance of claim 1, wherein the one or more surface cleaning mechanisms is configured to be removable from the housing for cleaning.

9. The home cooking appliance of claim 4, wherein the surface cleaning element is configured to be removable from the one or more surface cleaning mechanisms for cleaning.

10. The home cooking appliance of claim 4, wherein the surface cleaning element is disposed in a fixed position.

11. The home cooking appliance of claim 4, wherein the surface cleaning element is movable with respect to a body of the one or more surface cleaning mechanisms.

12. The home cooking appliance of claim 4, further comprising:
    an actuator configured to move at least one of the one or more surface cleaning mechanisms with respect to the housing or the surface cleaning element with respect to a body of the one or more surface cleaning mechanisms, or a combination thereof, such that the surface cleaning element is movable between a position in which the surface cleaning element does not contact the glass surface and another position in which the surface cleaning element contacts the glass surface.

13. The home cooking appliance of claim 4, further comprising:

a biasing element configured to bias the surface cleaning element against the glass surface.

14. The home cooking appliance of claim 1, wherein the housing includes a pocket adjacent to the wall of the cooking cavity, and
wherein at least a portion of the door having the glass surface is configured to be stowed in the pocket when the door is retracted into the cavity adjacent to the wall of the cooking cavity.

15. The home cooking appliance of claim 14, wherein the one or more surface cleaning mechanisms is disposed in the pocket and configured to contact at least the portion of the glass surface during a movement of the portion of the door having the glass surface within the pocket.

16. The home cooking appliance of claim 1, further comprising:
a debris collection device configured to collect debris removed from the glass surface by the one or more surface cleaning mechanisms.

17. The home cooking appliance of claim 16, further comprising:
a wiping mechanism configured to, after the one or more surface cleaning mechanisms removes debris from the glass surface, remove at least a portion of the debris from the one or more surface cleaning mechanisms and guide the portion of the debris into the debris collection device.

18. The home cooking appliance of claim 1, wherein the door includes a vision system having a camera configured to view into the cooking cavity through a region of the door glass, and
wherein the portion of the glass surface cleaned by the one or more surface cleaning mechanisms includes the region of the door glass.

19. A home cooking appliance comprising:
a housing having a cooking cavity;
a retractable door system having door glass, the door glass having a glass surface facing an interior of the cooking cavity when the door is in a closed state; and
means for removing debris from at least a portion of the glass surface during at least one of a retraction of the door into a cavity adjacent to a wall of the cooking cavity or an extraction of the door from the cavity, or a combination thereof,
wherein the means for removing is disposed in the cavity.

20. The home cooking appliance of claim 7, wherein the plurality of surface cleaning elements includes one or more of a blade, a shaped surface edge, a squeegee, a tumbler, a roller, an abrasive material, a wire, or a cable, or a combination thereof, configured to remove at least a portion of the debris from the glass surface during movement of the door.

* * * * *